United States Patent [19]

Tamura et al.

[11] Patent Number: 5,098,751
[45] Date of Patent: Mar. 24, 1992

[54] FOOD PACKAGING CONTAINER

[75] Inventors: Eiji Tamura; Hideo Kawai; Isamu Yamamoto; Hiroshi Hasunuma, all of Sakai, Japan

[73] Assignees: Idemitsu Petrochemical Company Limited, Tokyo; Showa Aluminim Corporation, Osaka, both of Japan

[21] Appl. No.: 467,245

[22] Filed: Jan. 19, 1990

[30] Foreign Application Priority Data

Aug. 31, 1989 [JP] Japan .................. 1-226482

[51] Int. Cl.$^5$ .................. B32B 1/08; B65D 90/04
[52] U.S. Cl. .................. 428/35.8; 220/450; 220/453; 428/215; 428/457; 229/245
[58] Field of Search .................. 428/35.7, 457, 35.8, 428/35.9, 215, 216; 206/631, 633; 220/450, 453

[56] References Cited

U.S. PATENT DOCUMENTS 4,905,838 3/1990 Suzuki et al. .................. 206/631

Primary Examiner—James J. Seidleck
Assistant Examiner—Charles R. Nold
Attorney, Agent, or Firm—Antonelli, Terry Stout & Kraus

[57] ABSTRACT

A food packaging container having a flanged container body of a laminate sheet which comprises a layer of aluminum foil and at leasat one thermoplastic resin layer joined to one surface of the foil layer. The container body is prepared by deep-drawing the laminate sheet with the resin layer inside. The aluminum foil is 40–200 µm in thickness, 9.0–25.0 kgf/mm$^2$ in tensile strength, 2.5–9.5 kgf/mm$^2$ in proof stress, 10 to 40% in elongation and up to 7% in earing ratio. The resin layer comprises a thermoplastic resin 100–500 µm in thicknes, 0.92–1.08 in the ratio of modulus of elasticity in tension in the machine directon (MD) to that in the transverse direction (TD), 0.60–1.40 in the MD/TD ratio of elongation and 0.40–1.60 in the MD/TD ratio of breaking strength.

25 Claims, 14 Drawing Sheets

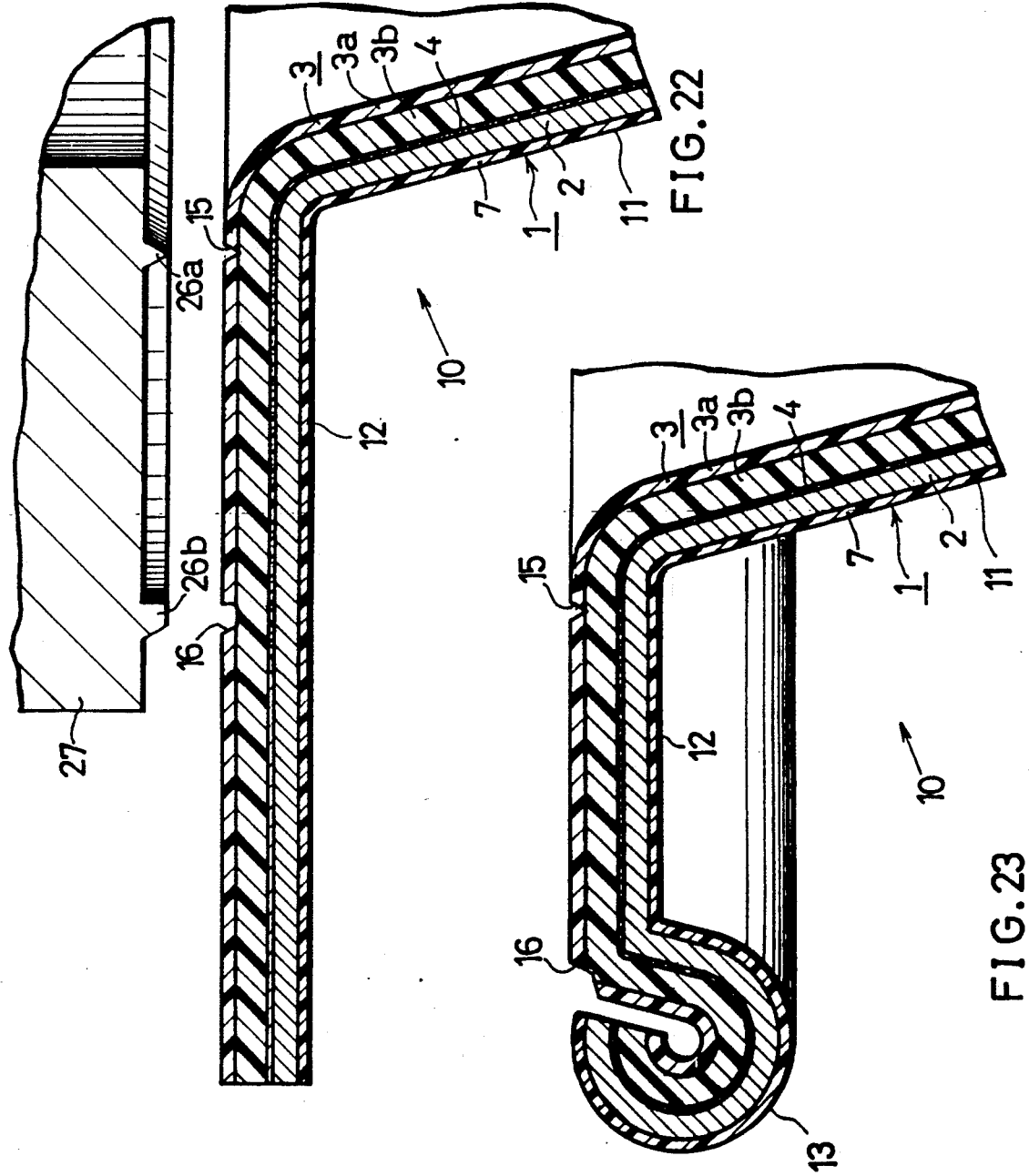

FOOD PACKAGING CONTAINER

BACKGROUND OF THE INVENTION

The present invention relates to food packaging containers for use in packaging, for example, desserts, foods to be cooked or cooked foods.

Conventional food packaging containers were prepared from a laminate sheet which was composed of aluminum foil and a synthetic resin layer joined to one surface of the foil. The aluminum foil had a greater thickness than the synthetic resin layer.

The shape retentivity of such conventional containers is dependent on the material characteristics of the aluminum foil. The containers therefore had the the problem of being inferior in impact resistance and compression resistance and susceptible to deformation during transport or handling.

To overcome this problem, we carried out extensive research and developed laminate sheets comprising aluminum foil and a synthetic resin layer which conversely had a greater thickness than the foil, along with various attempts to prevent to the greatest possible extent the deformation of containers prepared from these sheets. However, our research revealed another problem that when the blank was subjected to deep drawing, the flange of the resulting container wrinkled locally.

If an increased blank holder pressure was applied to the flange to eliminate the wrinkling, use of common synthetic resin film encountered the following problem since the properties of the film differ in different directions. Although no wrinkle then occurred in the flange, the material was drawn unevenly circumferentially of the flange, so that the drawing operation produced variations in the width of the flange, causing a fracture in the direction in which the material was smaller in elongation. To be sure, the flange can be made free of wrinkling and planar by increasing the blank holder pressure, whereas the flange is not uniform in the residual strain of the material. This resulted in the problem that for example when the container obtained was heated for sterilization with retorted food placed therein, the flange wrinkled in an undulating or wavy fashion and became deformed.

SUMMARY OF THE INVENTION

The main object of the present invention is to provide a food packaging container free of the above problems.

The food packaging container of the invention has a flanged container body prepared from a laminate sheet comprising a layer of aluminum foil and at least one thermoplastic resin layer joined to one surface of the layer, by deep-drawing the laminate sheet with the resin layer inside. The container is characterized in that the aluminum foil layer of the laminate sheet comprises an aluminum foil 40-200 $\mu$m in thickness, 9.0-25.0 kgf/mm$^2$ in tensile strength, 2.5-9.5 kgf/mm$^2$ in proof stress, 10-40% in elongation and up to 7% in earing ratio, and that the thermoplastic resin layer of the sheet comprises a thermoplastic resin 100-500 $\mu$m in thickness, 0.92-1.08 in the ratio of modulus of elasticity in tension in the machine direction (MD) to that in the transverse direction (TD)(MD/TD ratio of modulus of elasticity in tension), 0.60-1.40 in the MD/TD ratio of elongation and 0.40-1.60 in the MD/TD ratio of breaking strength.

Preferably, the food packaging container is at least 40% in drawing ratio, i.e., in the ratio of the depth of the container body to the opening diameter of the body (H/W). To prevent the flange of the container from wrinkling during deep drawing, the thermoplastic resin layer is given a larger thickness than the aluminum foil layer.

The aluminum foil and the resin layer forming the laminate sheet have sufficient strength, permitting the sheet to be deep-drawn into food packaging containers free of wrinkling. Accordingly, even if an increased blank holder pressure is applied to the flange, the sheet can be shaped into the container satisfactorily without developing any fracture. The container obtained has excellent shape retentivity and is resistant to deformation by impact or the like during transport or handling. Further since the aluminum foil of the laminate sheet has no anisotropy, the material can be deep-drawn uniformly circumferentially of the flange, consequently giving a uniform width to the resulting container without causing any fracture to the material. Even if a greater blank holder pressure is applied to the flange, the flange can be uniform in the residual strain of the material. As a result, no undulation occurs in the flange in the case where the container is heated for sterilization with retorted food placed therein. Further because the laminate sheet is amenable to cold deep drawing, food packaging containers can be manufactured with a very high efficiency and high productivity.

The present invention will be described in greater detail with reference to the accompanying drawings.

BRIEF DESCRIPTION OF THE DRAWINGS

FIG. 14 is an enlarged fragmentary view in section of a food packaging container having no curled edge before heat sealing;

FIG. 15 is an enlarged fragmentary view in section showing the same after heat sealing;

FIG. 16 is an enlarged fragmentary view in section of a food packaging container having a curled edge before heat sealing;

FIG. 17 is an enlarged fragmentary view of the same after heat sealing;

FIG. 18 is an enlarged fragmentary view in section of another food packaging container having a curled edge before heat sealing;

FIG. 19 is an enlarged fregmentary view in section of the same after heat sealing;

FIG. 22 is an enlarged fragmentary view in section showing the same container having a flat flange before the reversely curled edge is formed;

FIG. 23 is an enlarged fragmentary view in section of the same container formed with the reversely curlved edge on its frange;

DESCRIPTION OF THE PREFERRED EMBODIMENTS

Figure 1:
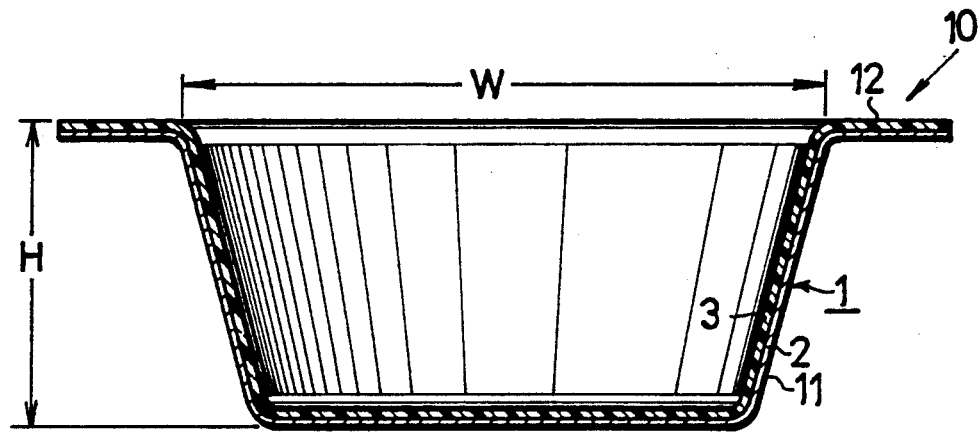
FIG. 1 is a sectional view schematically showing a food packaging container having no curled edge and embodying the invention.
Figure 2:
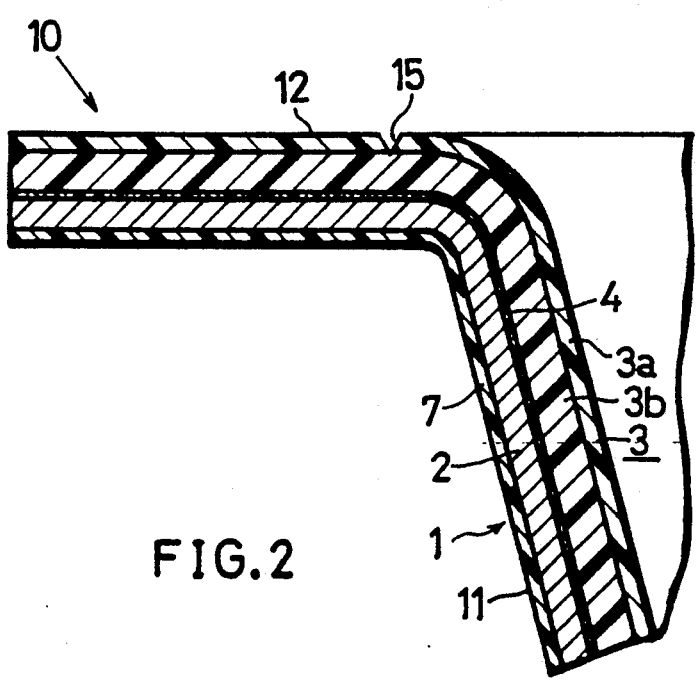
FIG. 2 is an enlarged fragmentary view in section of FIG. 1.

Throughout the drawings, like parts are designated by like reference numerals.

With reference to FIG. 1, a food packaging container 10 has a container body 11 having a flange 12 and prepared from a laminate sheet 1 which comprises an aluminum foil layer 2 and at least one thermoplastic resin layer 3 joined to one surface of the layer 2, by subjecting the sheet 1 to a cold deep-drawing process with the resin layer 3 inside.

The aluminum foil layer 2 of the laminate sheet 1 comprises an aluminum foil which is 40–200 μm in thickness, 9.0–25.0 kgf/mm² in tensile strength, 2.5–9.5 kgf/mm² in proof stress, 10–40% in elongation and up to 7% in earing ratio. The thermoplastic resin layer 3 of the sheet 1 comprises a thermoplastic resin which is 100–500 μm in thickness, 0.92–1.08 in the ratio of modulus of elasticity in tension in the machine direction (MD) to that in the transverse direction (TD) (i.e., in the MD/TD ratio of modulus of elasticity in tension), 0.60–1.40 in the MD/TD ratio of elongation and 0.40–1.60 in the MD/TD ratio of breaking strength.

The aluminum foil layer 2 of the laminate sheet 1, when less than 40 μm in thickness, is insufficient in strength, is liable to fracture when the container 10 is formed and renders the resulting container 10 unable to retain its shape owing to the springback of the resin layer 3. The aluminum foil layer 2, when over 200 μm in thickness, requires an increased amount of aluminum and is disadvantageous economically.

In the case where the drawing ratio of the food packaging container 10, i.e., the ratio of the depth of the container body 11 to the opening diameter thereof (H/W, see FIG. 1), is not smaller than 40%, it is desired that the thickness of the aluminum foil layer 2 be 80 to 200 μm so as to prevent the flange 12 from undulation when the container obtained is sterilized by boiling or when the container is sterilized by retorting with food enclosed therein.

Further if the aluminum foil layer 2 is less than 9.0 kgf/mm² in tensile strength and less than 2.5 kgf/mm² in proof stress, the layer is insufficient in strength, therefore low in impact resistance and in compression resistance and prone to deformation during transport or handling. Further when exceeding 25.0 kgf/mm² in tensile strength and 9.5 kgf/mm² in proof stress, the aluminum foil layer 2 has excessive strength, and is diffuclt to shape and undesirable. Further if less than 10% in elongation, the aluminum foil layer 2 will break during deep drawing, whereas if excedding 40% in elongation, the foil layer 2 is lower in strength and therefore undesirable. When the earing ratio of the aluminum layer 2 is over 7%, the material will not be drawn uniformly over the entire circumference of the flange but so-called ears will be formed markedly to render the flange uneven in width on drawing, making it impossible to form a uniform curled edge at the outer end of the flange.

The thermoplastic resin layer 3 of the laminate sheet 1 is made of a thermoplastic resin. Examples of such resins are polyolefins such as polypropylene and polyethylene, polyester, polyvinyl chloride, polycarbonate, polystyrene, copolymers of such resins, and blends of such resins in suitable proportions.

The thermoplastic resin layer 3 has a thickness of 100–500 μm, preferably 200–400 μm, in its entirety. When less than 100 μm in thickness, the resin layer 3 is insufficient in strength, failing to enable the container 10 to retain its shape as expected, and is less effective to prevent the container from deformation during transport or handling. Thicknesses exceeding 500 μm result in increased spring back and make the material unamenable to cold deep drawing and unable to form containers with high productivity.

To prevent the flange of the food packaging container 10 from wrinkling locally during deep drawing, the thermoplastic resin layer 3 is given a larger thickness than the aluminum foil layer 2.

The thermoplastic resin layer 3 is 0.92–1.08 in the MD/TD ratio of modulus of elasticity in tension, 0.60–1.40 in the MD/TD ratio of elongation and 0.40–1.60 in the MD/TD ratio of breaking strength. When the mechanical properties of the resin layer 3 are outside the above ranges, the layer is anisotropic, with the result that the material will not be drawn uniformly circumferentially of the flange to give an uneven width to the resulting flange 12. The resin layer 3 is then also prone to fracture.

The food packaging container 10 thus prepared from the laminate sheet 1 has an excellent barrier property due to the presence of the aluminum foil layer 2, so that the contents thereof, such as dessert, food to be cooked or cooked food, can be preserved effectively for a prolonged period of time. With the thermoplastic resin layer 3 joined to the aluminum foil layer 2, the container has exceedingly high strength and is resistant to denting under impact. Moreover, the use of the aluminum foil layer 2 gives a sophisticated esthetic appearance to the container. Additionally, the container can be formed by deep drawing. When the container obtained by deep drawing even with a drawing ratio (depth H/opening diameter W) of at least 40% is sterilized by boiling, or by retorting with food enclosed therein, the flange of the container remains free of any wrinkling. The container is therefore excellent in quality and can be manufactured in quantities with high productivity.

The thermoplastic resin layer 3 comprises (I) a single thermoplastic resin, (II) unstretched co-extruded thermoplastic resins in the form of at least two layers, or (III) at least two thermoplastic resin layers which are separably joined together with an adhesive layer provided therebetween.

With the embodiment shown in FIGS. 2 to 5, the thermoplastic resin layer 3 of the laminate sheet 1 comprises unstretched co-extruded thermoplastic resins (II), i.e., a first resin layer 3a on the surface to be joined to a heat-sealing material layer 22 of a lid 21, and a second resin layer 3b separably joined to the rear side of the layer 3a. The aluminum foil layer 2 is joined to the resin layer 3 with an adhesive layer 4 provided therebetween. The flange 12 has along the entire circumference thereof an annular incision 15 of V-shaped cross section formed in the first thermoplastic resin layer 3a and positioned close to the opening-defining inner periphery of the container body 11.

Useful as the unstretched co-extruded thermoplastic resins (II) is a combination of thermoplastic resins such as polypropylene, polyethylene, polyester, polyvinyl chloride, polycarbonate, etc. It is especially desirable to use high-density polyethylene for the resin layer 3a on the surface side, and one of polypropylene and a mixture of polypropylene and polyethylene for the resin layer 3b to be separably joined to the rear side of the layer 3a. The polypropylene to polyethylene ratio of the mixture is, for example, 50:50 to 97:3 by weight. Other thermoplastic resins may be used in combination in the form of at least two layers.

The peel strength between the the first thermoplastic resin layer 3a on the front side and the second thermoplastic resin layer 3b on the rear side is 500–1500 g/15 mm width, preferably 700–900 g/15 mm width.

Since the co-extruded thermoplastic resins (II) are unstretched, these resins are diminished in orientation, are therefore satisfactorily shapable and undergo plastic deformation highly coextensively with the aluminum foil layer 2. Accordingly, the material can be shaped by cold deep drawing and has the advantage that the food packaging container 10 with a great depth can be manufactured with a very high efficiency and excellent productivity.

The incision 15 to be provided in the flange 12 close to the opening-defining edge of the container body 11 can be formed, for example, by cutting off a portion of the first resin layer 3a with a blade or thermally removing a portion thereof. The incision 15 need not always be V-shaped but optional in cross section. The illustrated separating incision 15 may alternatively be formed in the opening edge portion itself of the container body 11.

Examples of adhesives useful for forming the adhesive layer 4 to be interposed between the aluminum foil layer 2 and the thermoplastic resin layer 3 of unstretched co-extruded resins are urethane and polyester adhesives, maleinized polypropylene and ionomers, i.e. monoolefin-unsaturated carboxylic acid copolymer resins or metal salts thereof (see, for example, Examined Japanese Patent Publication SHO 61-54587).

The adhesive layer 4 is formed, for example, by one of the following three methods.
(1) The adhesive is dissolved in a suitable solvent, and the adhesive solution is applied. In this case, the adhesive is applied usually in an amount of about 3 to about 5 g/m$^2$.
(2) The adhesive as melted is caused to continuously flow in between the aluminum foil layer 2 and the thermoplastic resin layer 3 and is thereby sandwiched between the two layers.
(3) A film of adhesive is prepared first and then sandwiched between the two layers, which are thereafter heated to about 200° C. as by a hot press for bonding.

In the case of the methods (2) and (3), the adhesive is applied to a thickness of 5 to 50 μm, preferably 10 to 20 μm.

A suitable kind of adhesive is used in accordance with the kind of thermoplastic resin layer 3 as an adherend.

The monoolefin-unsaturated carboxylic acid copolymer resins or metal salts thereof serving as adhesives are as follows.

The monoolefin-unsaturated carboxylic acid copolymer resins consist basically of a resin obtained by copolymerizing an α-monoolefin, such as ethylene, propylene, 1-butene, isobutane, 4-methyl-1-pentene, 1-hexene or 1-heptene, with an α,β-unsaturated carboxylic acid such as acrylic acid, methacrylic acid, ethacrylic acid or crotonic acid. Typical of such resins are ethylene-acrylic acid copolymer resin and ethylene-methacrylic acid copolymer resin. These copolymer resins are 1000 to 200000 in molecular weight and have an unsaturated carboxylic acid content of 1 to 30% by weight, preferably 2 to 20% by weight.

Examples of metal salts of the monoolefin-unsaturated carboxylic acid copolymer resins are ion-crosslinked resins, i.e., ionomers obtained by neutralizing the carboxyl group of the copolymer resin with sodium, potassium or like alkali metal ion or zinc, magnesium or like alkaline earth metal ion. The degree of neutralization with the metal ion is, for example, 0.5 to 40%. It is especially desirable to use the zinc salt of ethylene-methacrylic acid copolymer resin as an ionomer resin. Such ionomer resins have a carboxylic acid content of 5 to 18% and an ionization degree of several % to 90%.

The monoolefin-unsaturated carboxylic acid copolymer resin or the metal salt thereof may contain an inorganic compound.

Examples of such inorganic compounds are oxides, hydroxides, carbonates and sulfates of magnesium, calcium, aluminum, titanium and silicon, talc, clay, feldspar, mica, barite and the like. The carbonate of calcium and talc are especially desirable to use. The inorganic compound is 0.1 to 50 μm, preferably 0.5 to 30 μm, in means particle size.

When the copolymer resin or metal salt thereof is to contain the inorganic compound, up to 30 parts by weight, usually 0.1 to 10 parts by weight, preferably 1 to 5 parts by weight, of the inorganic compound is to be admixed with 100 parts by weight of the copolymer resin or metal salt.

The adhesive layer 4, especially when prepared from the monoolefin unsaturated carboxylic acid copolymer resin or metal salt thereof, has a sufficient thickness and reliably bonds the layer 3 to the foil layer 2 like urethane adhesives even if the surface of the adherend bears gel-like projections or extraneous matter, consequently preventing separation of the thermoplastic resin layer 3 during shaping.

Further even if the composite sheet is drawn under a very severe condition by cold deep drawing to form the bottom corner portion of the container, the resin layer 3 and the adhesive layer 4 of monoolefin-unsaturated carboxylic acid copolymer resin or metal salt thereof have a sufficient thickness. Accordingly, in the case where a food containing a highly penetrating flavoring or the like is hermetically enclosed in the container, the resin layer 3 will not separate off during the preservation of the food. Thus, the container has an exceedingly high quality.

Figure 3:
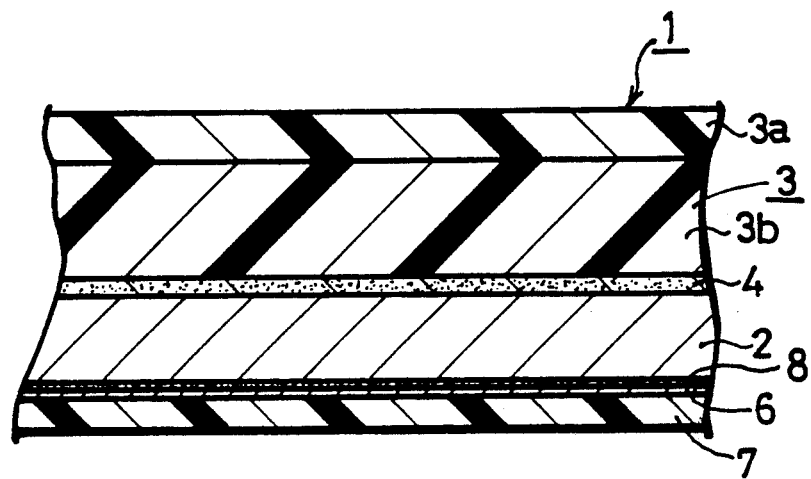
FIG. 3 is an enlarged fragmentary view in section of a laminate sheet for forming the container of FIG. 2.

With reference to FIG. 3, the aluminum foil layer 2 is formed over its outer surface with a protective covering layer 7 for protecting the aluminum foil layer 2. The layer 7 is formed by coating the foil layer with a solution of a synthetic resin having high resistance to chemicals and weather, or by bonding a layer of the resin to the foil layer 2 with an adhesive layer 8. Preferably, the protective covering layer 7 is 1 to 50 μm in thickness. When the protective layer 7 is, for example, a coating of epoxy resin or nitrocellulose, it is preferable to apply the resin in an amount of 1 to 3 g/m². In thickness, the layer is 12 to 16 μm when made of polyethylene phthalate film, or 20 to 50 μm when made of unstretched polypropylene film, or 15 to 20 μm when made of nylon film.

For example, common urethane, polyester or like adhesive is used for the adhesive layer 8 for bonding the protective covering layer 7 to the outer surface of the aluminum foil layer 2. A suitable kind of adhesive is used in accordance with the kind of the adherend.

The thickness of the protective covering layer 7 may be larger than 50 μm. In this case, however, the synthetic resin forming the layer 7 must have the same mechanical properties as the thermoplastic resin layer 3 of the laminate sheet 1. To bond the layer 7 to the aluminum foil layer 2 with enhanced strength, it is desirable to form on the outer surface of the foil layer 2 a synthetic resin ground layer containing a zirconium compound or chromium compound.

With reference to FIG. 3, a printing layer 6 is provided between the aluminum foil layer 2 and the protective covering layer 7. The printing layer 6 is formed, for example, with a polyvinyl chloride-vinyl acetate, nitrocellulose, urethane or like ink.

Figure 4:
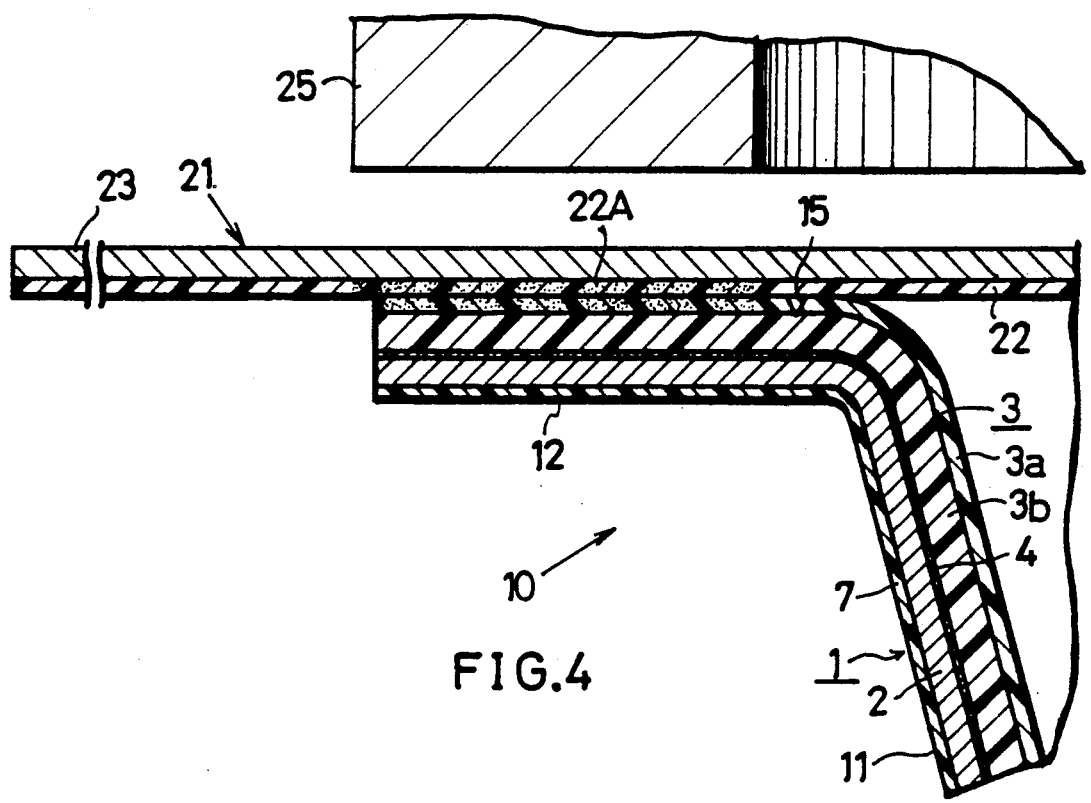
FIG. 4 is an enlarged fragmentary view in section of the food packaging container when it is to be heat-sealed.
Figure 5:
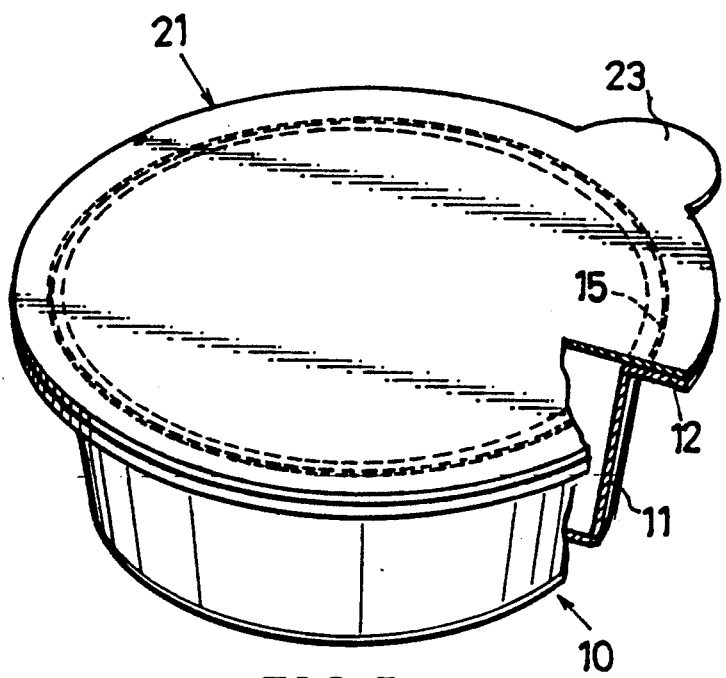
FIG. 5 is a perspective view partly broken away and schematically showing the container of FIG. 4 as heat-sealed with a lid placed thereon.

With reference to FIGS. 4 and 5, the container 10 having contents, such as dessert, food to be cooked or cooked food (not shown), placed therein is covered with the lid 21 having the heat-sealing material layer 22 on its lower surface. The portion of the first thermoplastic resin layer 3a of the container body flange 12 outward from the incision 15 and the portion 22A of heat-sealing material layer 22 corresponding thereto are heat-sealed by being fused with the heat-pressing member 25 of a heat-sealing device.

The two thermoplastic resin layers 3a and 3b of the unstretched co-extruded resin layer 3 are easily separably in intimate contact with each other. More specifically, the adhesive strength between the innermost first resin layer 3a of the container body 11 and the second resin layer 3b thereof is smaller than the adhesive strength between the first resin layer 3a and the heat-sealing material layer 22 of the lid 21 of the fused portion outward from the incision 15, so that the portion of the first resin layer 3a on the surface side of the layer 2 outward from the incision 15 can be easily peeled, as joined to the heat-sealing material layer 22 of the lid 21, off the second resin layer 3b of the container body 11 when an opening knob portion 23 of the lid 21 is pulled upward.

Figure 6:
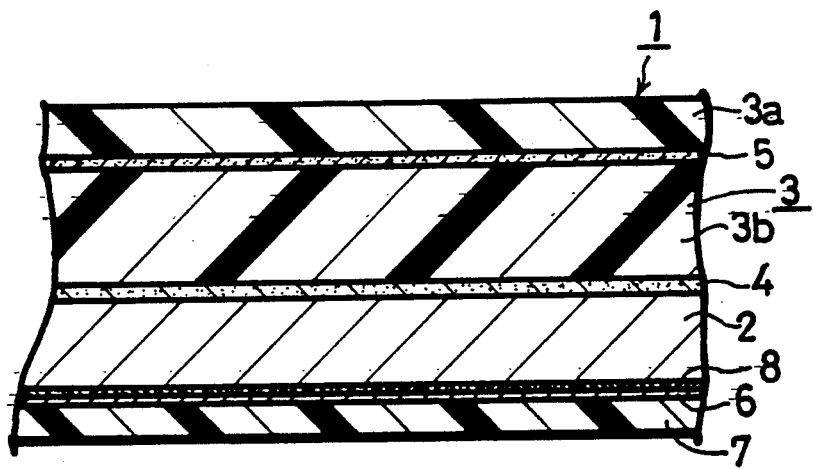
FIG. 6 is an enlarged fragmentary view in section showing a modified laminate sheet.

With reference to FIG. 6, the thermoplastic resin layer 3 of a modified laminate sheet 1 comprises two layers 3a and 3b of different thermoplastic resins (III) which are separably joined together by a joint layer 5. An aluminum foil layer 2 is bonded to the layer 3 by an adhesive layer 4.

Examples of thermoplastic resins useful for forming the first layer 3a on the surface side of the layer 3 and the second layer 3b on the rear side of the layer 3a are those exemplified above, i.e., polypropylene, polyethylene, nylon, polyvinyl chloride, polycarbonate and the like.

For example, polyether adhesives ensuring ease of peeling are used for the joint layer 5 for separably joining together the first layer 3a on the surface side of the thermoplastic resin layer 3 and the second layer 3b on the rear side thereof. The joint layer 5 may be a usual adhesive layer of urethane, polyester or like adhesive, or may be formed by coating one surface of a layer of the monoolefin-unsaturated carboxylic acid copolymer resin or metal salt thereof to be described later, for example, with a silicone resin coating composition assuring ease of peeling.

In any of these cases, the peel strength between the first layer 3a of the thermoplastic resin layer 3 and the second layer 3b thereof is 500–1500 g/15 mm width, preferably 700–900 g/15 mm width.

The adhesive for forming the adhesive layer 4 for joining the layer 3 of two kinds of thermoplastic resins (III) to the aluminum foil layer 2 can be the same as the one used for forming the adhesive layer 4 for bonding the aluminum foil layer 2 to the layer 3 of unstretched co-extruded thermoplastic resins (II) already mentioned. Among useful resins, it is desirable to use the aforementioned monoolefin-unsaturated carboxylic acid copolymer resin or metal salt thereof.

A protective covering layer 7 is formed over the outer surface of the aluminum foil layer 2 with an adhesive layer 8 and a printing layer 6 interposed therebetween. These protective covering layer 7, adhesive layer 8 and printing layer 6 are the same as those of the embodiment described with reference to FIGS. 2 to 5.

Figure 9:
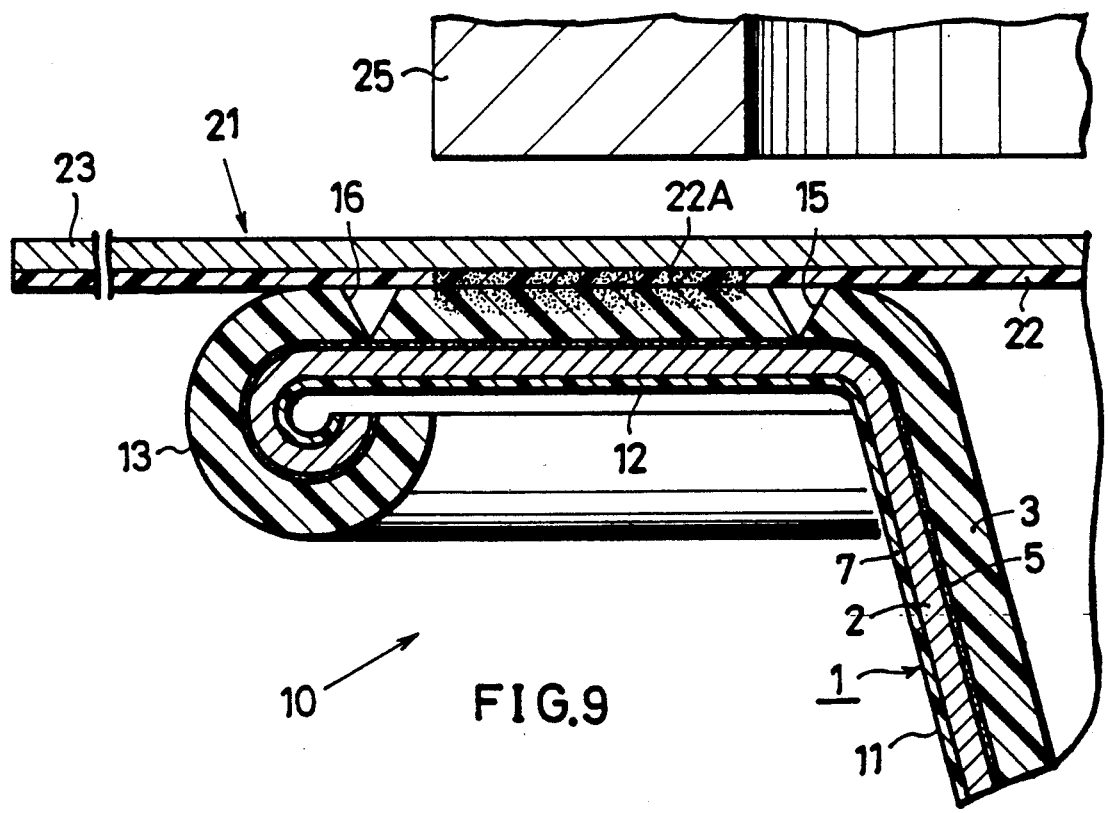
FIG. 9 is an enlarged fragmentary view in section of another food packaging container having a curled edge and embodying the invention when it is to be heat-sealed.

FIG. 9 shows a food packaging container 10 prepared from a laminate sheet 1 having a layer 3 of single thermoplastic resin (I). This container 10 will be described later in detail.

Figure 7:
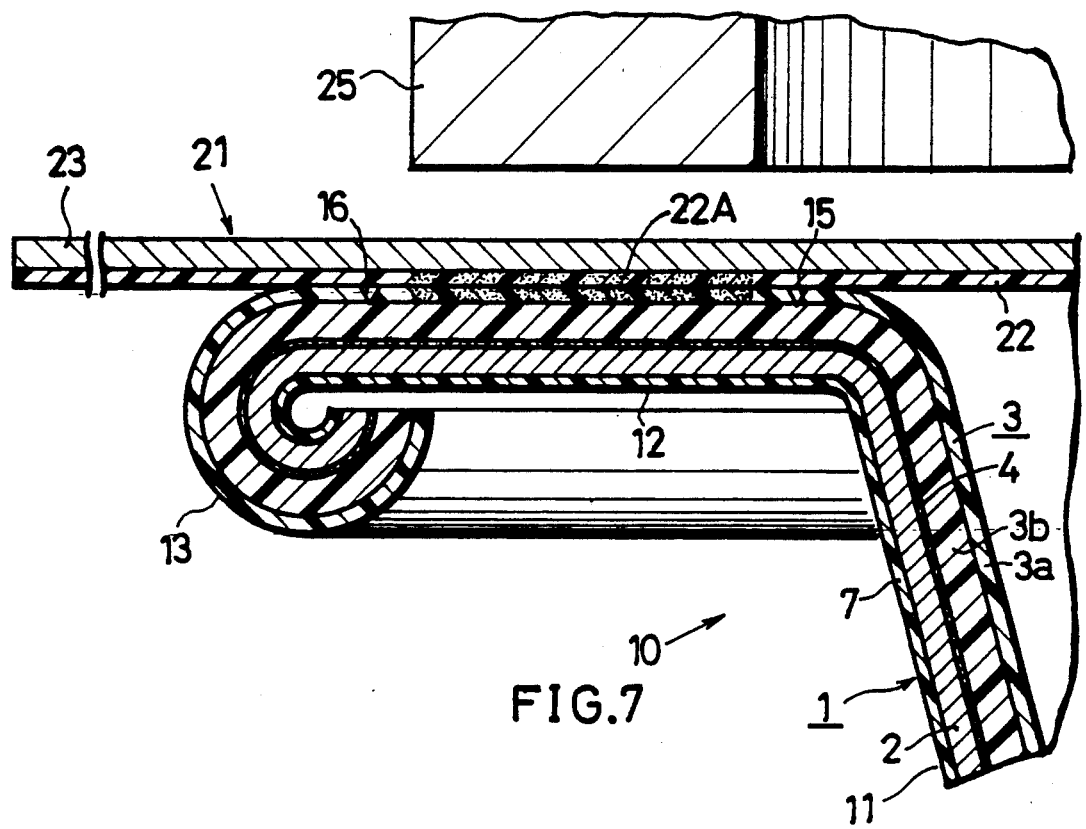
FIG. 7 is an enlarged fragmentary view in section of a food packaging container having a curled edge and embodying the invention when it is to be heat-sealed.
Figure 8:
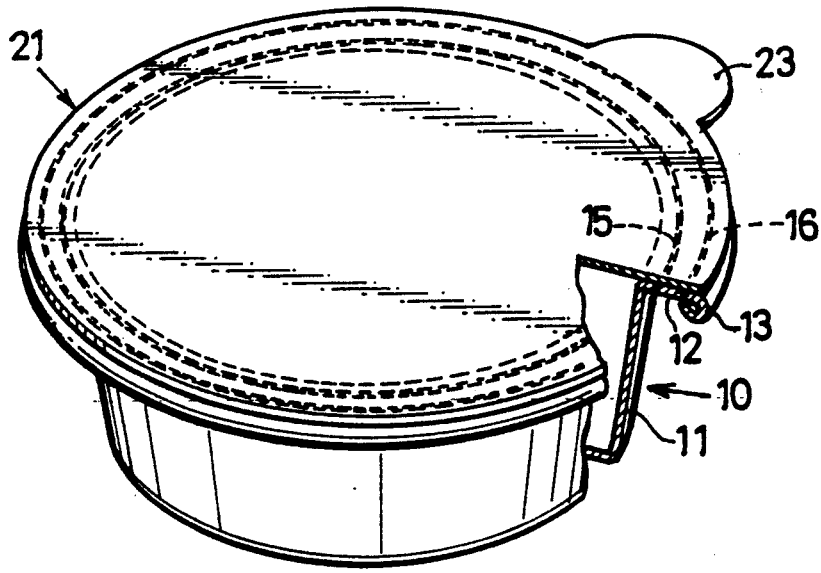
FIG. 8 is a perspective view partly broken away and schematically showing the container of FIG. 7 as heat-sealed with a lid placed thereon.

FIGS. 7 and 8 show another embodiment, i.e., a food packaging container 10 having a curled edge 13 at the outer end of a flange 12. The flange 12 is formed, in a first thermoplastic resin layer 3a on the surface side of a thermoplastic resin layer 3, with an incision 15 and an annular incision 16 each of V-shaped cross section which are positioned close to the opening-defining inner periphery of the body of the container and close to the curled edge 13, respectively, the incisions extending along the entire circumference of the flange 12. To the portion of the thermoplastic resin layer 3 of the flange 12 between the incisions 15, 16 is fused the corresponding portion 22A of a heat-sealing material layer 22 on the lower side of a lid 21 by the heat-pressing member 25 of a heat-sealing device.

The incisions 15, 16 are formed, for example, by partly cutting the first layer 4 with a blade or partly removing the first layer with heat. The distance between the two incisions 15, 16 is dependent on the width of heat sealing by the heat-pressing member 25 of the heat-sealing device. A satisfactory result can be obtained insofar as the heat-sealing material layer portion 22A on the lower side of the lid 21 is fused to the resin layer 3 of the flange at the portion thereof between the two incisions 15 and 16.

With the exception of the above feature, the embodiment of FIGS. 7 and 8 is the same as the embodiment of FIGS. 4 and 5.

The food packaging container 10 shown in FIG. 9 is prepared from a laminate sheet 1 having a layer 3 of single thermoplastic resin (I). To render the lid easily peelable from the container 10, an aluminum foil layer 2 and the thermoplastic resin layer 3 of the laminate sheet 1 forming the container body 11 are separably joined to each other by a joint layer 5 of a polyether adhesive having an adherend releasing property.

Although not shown, the joint layer 5 may be a usual adhesive layer of urethane, polyester or like adhesive, or may be formed by coating one surface of an adhesive layer of monoolefin-unsaturated carboxylic acid copolymer resin or metal salt thereof, for example, with a silicone resin coating composition assuring ease of peeling.

In any of the above cases, the peel strength between the aluminum foil layer 2 and the thermoplastic resin layer 3 of the laminate sheet 1 is 500 to 1500 g/15 mm width, preferably 700 to 900 g/15 mm width. Thus, the adhesive strength between the inside thermoplastic resin layer 3 of the container body 11 and the aluminum foil layer 2 thereof is made smaller than the adhesive strength between the resin layer 3 and the heat-sealing material layer 22 of the lid 21 fused thereto.

The flange 12 of the container 10 has a curled edge 13 at its outer end. The flange 12 is formed in the thermoplastic resin layer 3 with two incisions 15, 16 of V-shaped cross section extending generally along the entire circumference of the flange 12 and positioned close to the opening-defining inner periphery of the container body and close to the curled edge 13, respectively. To the portion of the thermoplastic resin layer of the flange 12 between the incisions 15, 16 is fused the corresponding portion 22A of the heat-sealing material layer 22 on the lower side of the lid 21 by the heat-pressing member 25 of a heat-sealing device.

When an opening knob portion 23 of the lid 21 is pulled upward, for example, with dessert, food to be cooked or cooked food packaged in the container 10, the portion of the resin layer 3 of the flange 12 between the incisions 15, 16 is readily peeled, as bonded to the portion 22A of the heat-sealing layer of the lid 21, off the aluminum foil layer 2. Thus, the container 10 can be opened with great ease.

Figure 10:
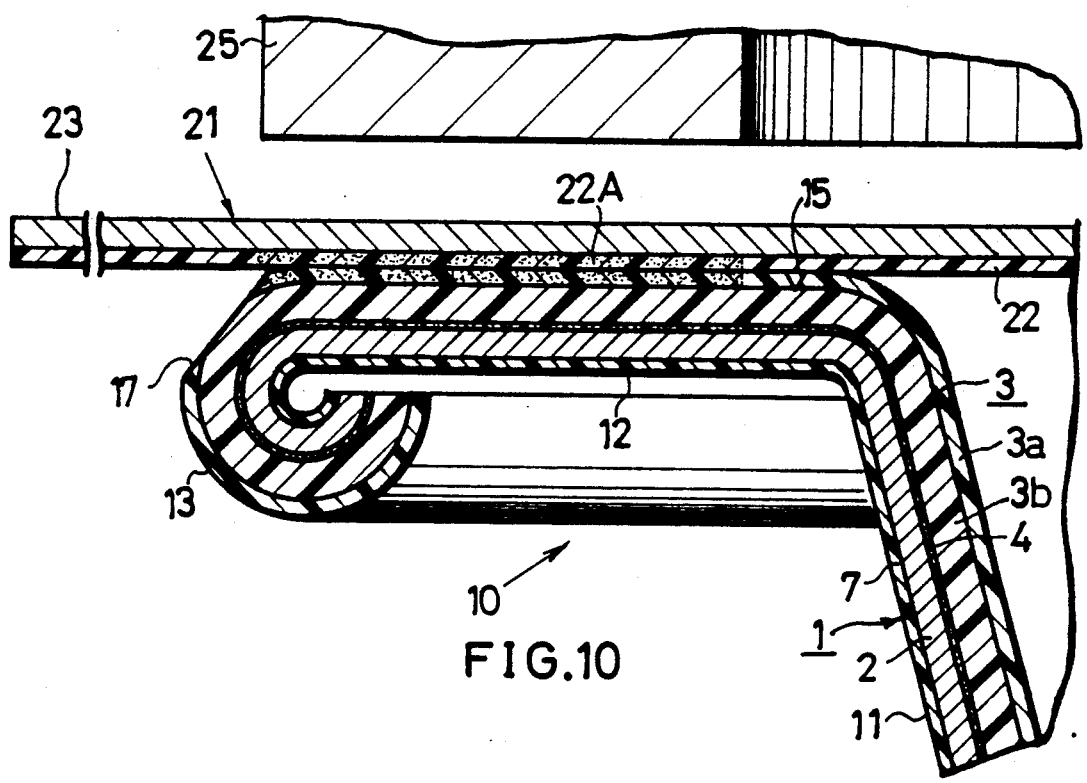
FIG. 10 is an enlarged fragmentary view in section of a food packaging container showing a modification of the incision of FIG. 7.
Figure 11:
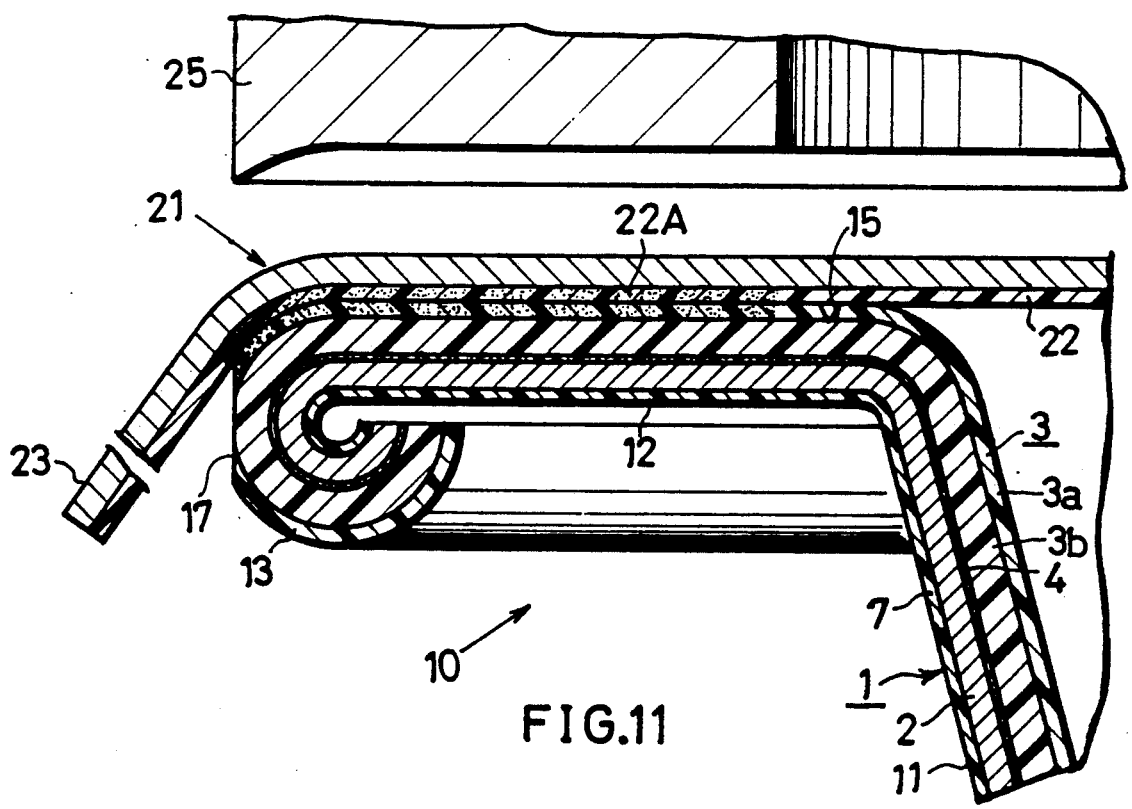
FIG. 11 is an enlarged fragmentary view in section of a food packaging container showing another modified incision.
Figure 12:
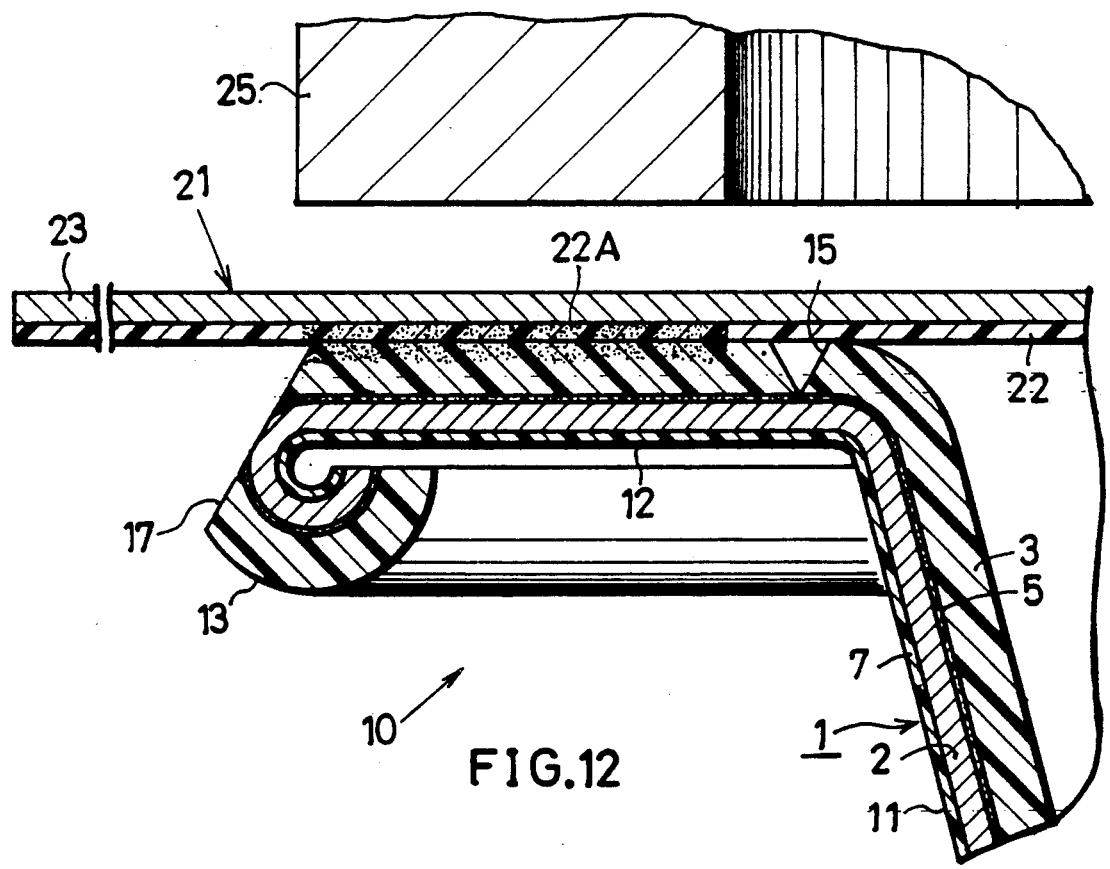
FIG. 12 is an enlarged fragmentary view in section of a food packaging container showing a modification of the incision of FIG. 9.

With the container 10 having the curled edge 13, the outer incision of the two incisions in the thermoplastic resin layer 3 of the flange 12 of the container body 11 may be formed in the curled edge 13 itself as seen in FIGS. 10 to 12.

First with reference to FIG. 10, the thermoplastic resin layer 3 of the flange 12 comprises unstretched co-extruded thermoplastic resins. A peeling cutout portion 17 formed in the first resin layer 3a of the curled edge 13 itself extends outward obliquely downward from the curl starting end of the curled edge 13. The cutout portion 17 is formed approximately over the entire circumference of the curled edge 13. With the exception of the above feature, the embodiment of FIG. 10 is the same as the one shown in FIG. 7.

The peeling cutout portion 17 of FIG. 11 is slightly different from the one shown in FIG. 10 and is formed by cutting the first thermoplastic resin layer 3a of the curled edge 13 itself along a vertical plane tangent to the second thermoplastic resin layer 3b. In this case, the thermoplastic resin layer 3 has some bent portion left on the curled edge 13, so that the heat-pressing member 25 of the heat-sealing device is preferably shaped in conformity with the shape of the bent portion.

The resin layer 3 of the flange 12 shown in FIG. 12 is made of a single thermoplastic resin. A peeling cutout portion 17 is formed in the resin layer 3 of the curled edge 13 itself and extends outward obliquely downward from the curl starting end of the curled edge 13, the cutout portion 17 being formed approximately over the entire circumference of the curled edge 13. A portion 22A of the heat-sealing material layer 22 on the lower side of the lid 21 is fused to the resin layer 3 over the portion thereof from the cutout portion 17 to the incision 15 by the heat-pressing member 25 of a heat sealing device so as to form a heat-sealed portion of required width.

With the exception of the above feature, the embodiment of FIG. 12 is the same as the one shown in FIG. 9.

Figure 13:
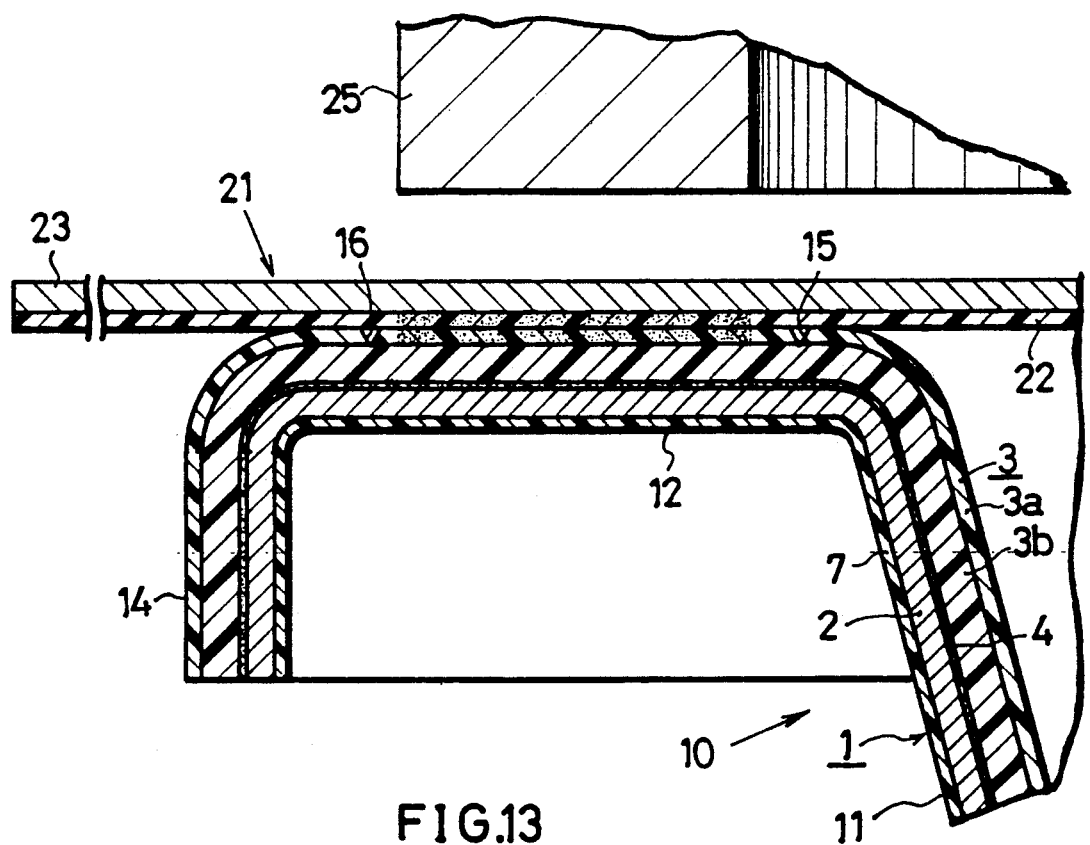
FIG. 13 is an enlarged fragmentary view in section of a food packaging container having a flange with a modified bent edge when the container is to be heat-sealed.

Further as seen in FIG. 13, the flange 12 of the food packaging container 10 may be formed with a bent edge 14 in place of the curled edge.

With the modification of FIG. 13, the outer end portion of the flange 12 outward from an outer incision 16 is bent downward. This eliminates the likelihood that the edge of the flange 12 will injure the hand of the person, while the presence of the bent edge 14 gives a sophisticated appearance to the container 10 and enhanced strength to the flange 12. Since the outer end portion of the flange 12 outward from the outer incision 16 is bent downward along the incision, the flange 12 is bendable with extreme ease, consequently making the container easy to manufacture. The bent edge 14 may be shaped otherwise, e.g., generally L-shaped in cross section. With the exception of the above feature, the embodiment of FIG. 13 is similar to the one shown in FIG. 7.

FIGS. 14 to 19 illustrate cases wherein an incision is formed in the flange 12 of the food packaging container 10 simultaneously when the heat-sealing material layer 22 of the lid 21 and the thermoplastic resin layer 3 of the flange 12 are heat-sealed.

Figure 14:
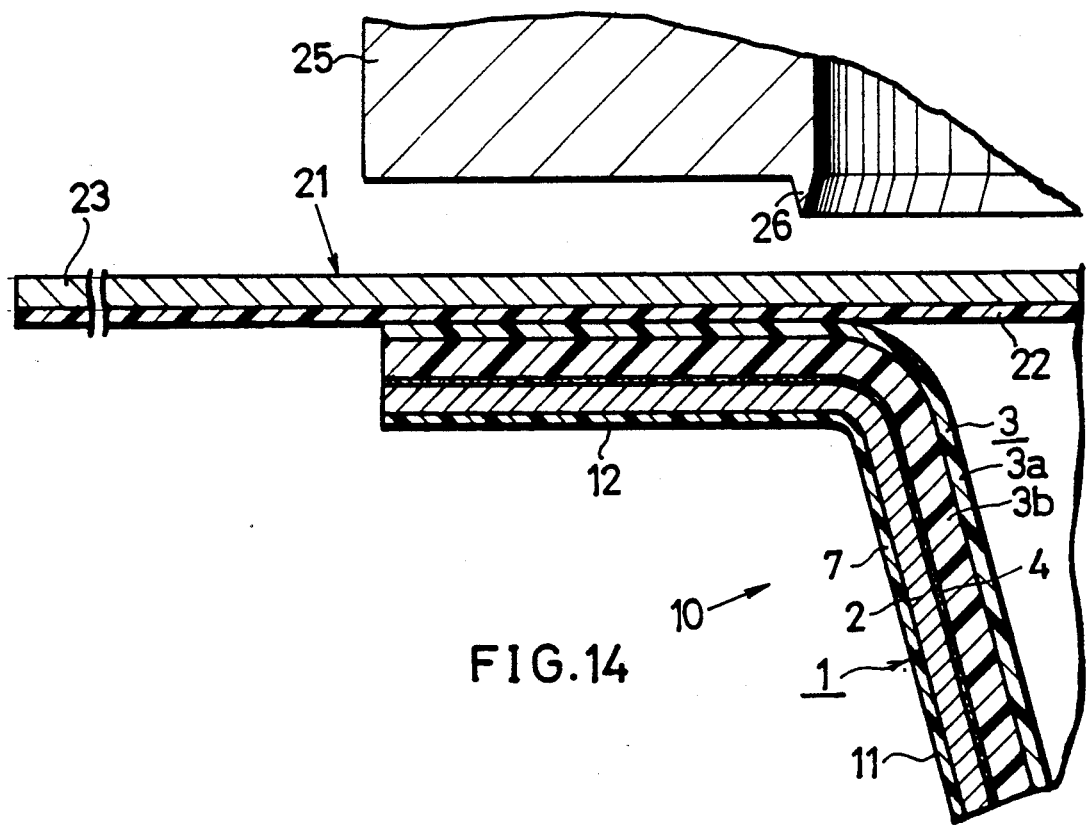
FIG. 14 to FIG. 19 show cases wherein a incision is formed simultaneously with heat sealing.
Figure 15:
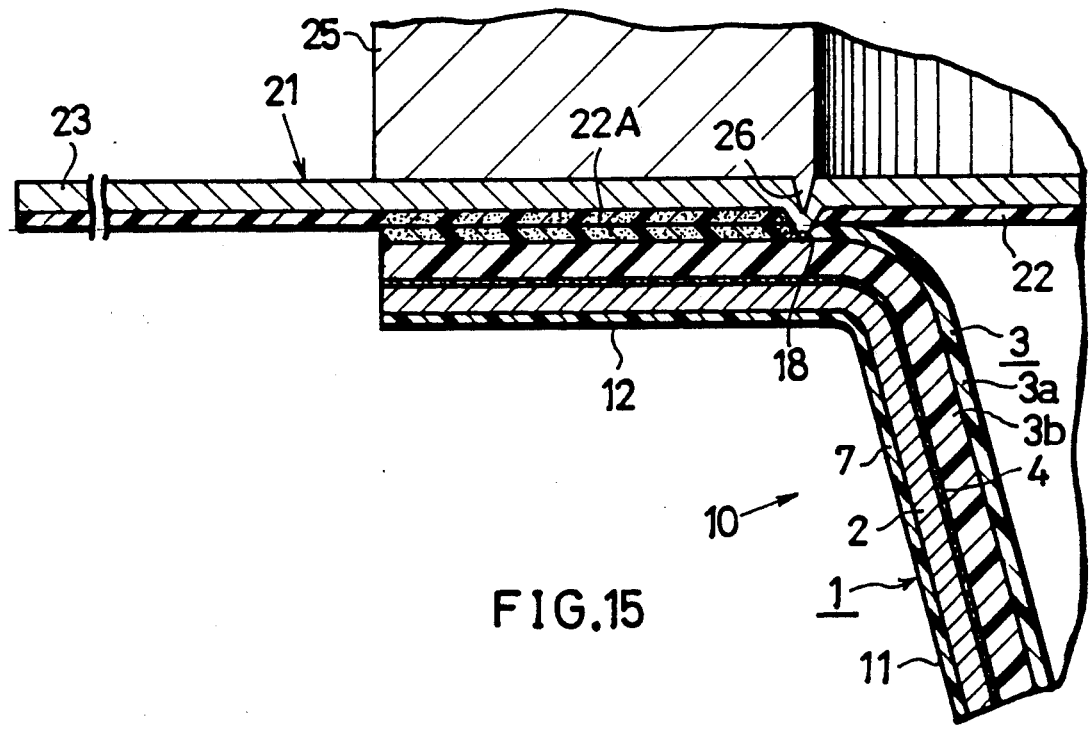

The container 10 shown in FIGS. 14 and 15 is of the type wherein the flange 12 has no curled edge. The resin layer 3 of the container body 11 comprises unstretched co-extruded thermoplastic resins (II). On the other hand, the heat-pressing member 25 of a heat-sealing device is provided along the inner periphery of lower surface thereof with an annular projection (notch blade) 26 projecting downward (see FIG. 14).

With dessert, food to be cooked, cooked food or like food placed in the container body 11, the lid 21 having the heat-sealing material layer 22 on its lower side is placed over the opening and flange 21 of the body 11. In this state, the heat-pressing member 25 is pressed against the peripheral portion of the lid 21 and the flange 12 to fuse the portion 22A of the heat-sealing material layer 22 and the portion of the thermoplastic resin layer 3a beneath the portion 22A, whereby a cutting groove (incision) 18 is formed in the first resin layer 3a with the annular projection 26 at the inner periphery of the heat-pressing member 25 at the same time. Thus, the container is heat-sealed and the groove 18 is formed by a single step (see FIG. 15).

The first thermoplastic resin layer 3a is made, for example, of high-density polyethylene having a melting point of 120° C., the second thermoplastic resin layer 3b is made of polypropylene having a melting point of 165° C., and the sealing material layer 22 of the lid 21 is formed of polyethylene having a melting point of 120° C. like the layer 3a. Accordingly, when the heat-pressing member 25 maintained at a temperature of about 120° C. is pressed against the first resin layer 3a and the heat-sealing material layer portion 22A, the two layers are fused, and at the same time, the annular projection 26 at the inner periphery of the heat-pressing member 25 melts the portion of the resin layer 3 opposed thereto to form the cutting groove (incision) 18.

While the thermoplastic resins for forming the two resin layers 3a, 3b of the laminate sheet 1 are not limited to the above combination, the thermoplastic resin to be used for the first layer 3a usually has a lower melting point than the thermoplastic resin for the second layer 3b.

Figure 16:
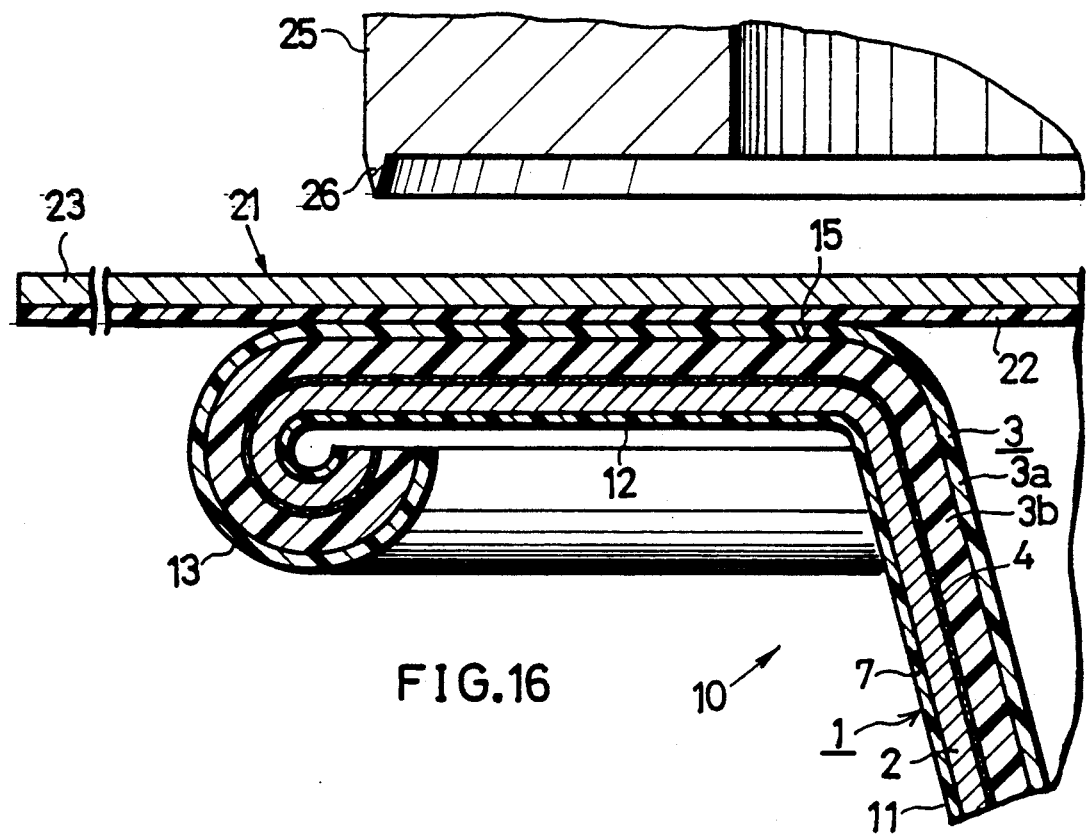
Figure 17:
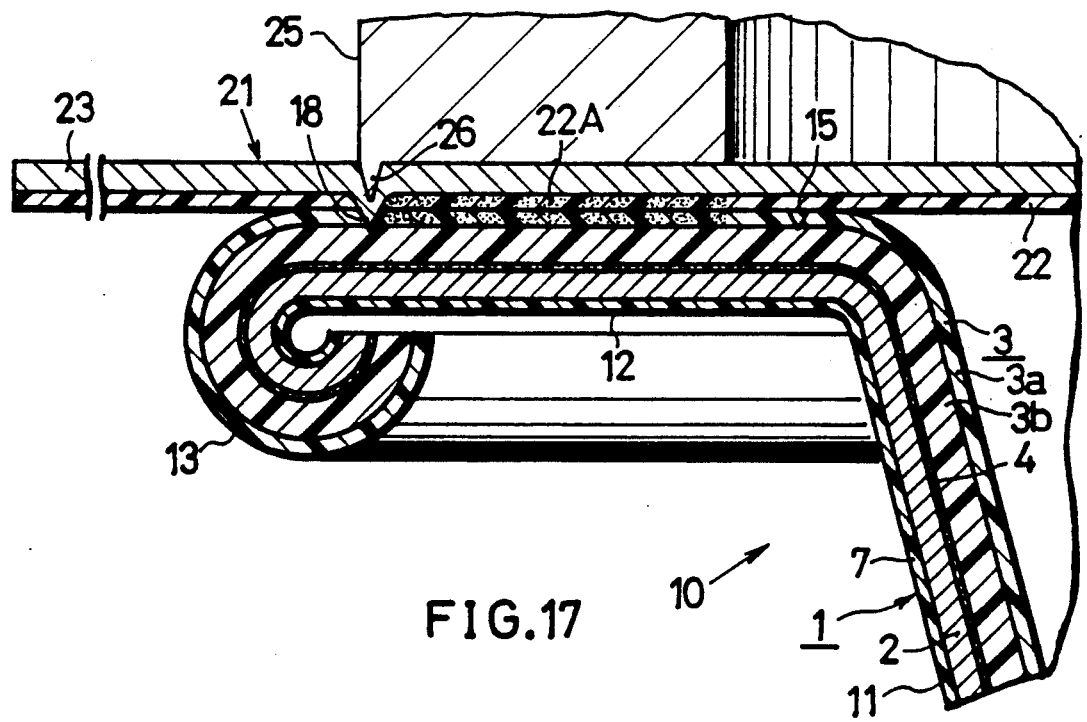

The food packaging container 10 shown in FIGS. 16 and 17 has two incisions formed in the flange 12 having a curled edge 13. The outer incision is formed simultaneously when the heat-sealing material layer 22 of the lid 22 and the thermoplastic resin layer 3 of the flange 12 are heat-sealed.

With reference to the drawings, the resin layer 3 of the laminate 1 forming the container body 11 comprises unstretched co-extruded thermoplastic resins (II). The curled edge 13 is formed at the outer end of the flange 12 of the container body 11. The flange 12 has the incision 15 already formed in the first resin layer 3a at a position close to the opening-defining inner periphery of the body 11 and extending generally along the entire circumference of the flange 12. On the other hand, the heat-pressing member 25 of a heat-sealing device has an annular projection 26 downwardly projecting from the outer periphery of its lower surface (see FIG. 16).

When the lid 21 is fused to the container body 11, a cutting groove (incision) 18 is formed in the first thermoplastic resin layer 3a at the same time with the annular projection 26 of the member 25 (see FIG. 17).

Figure 18:
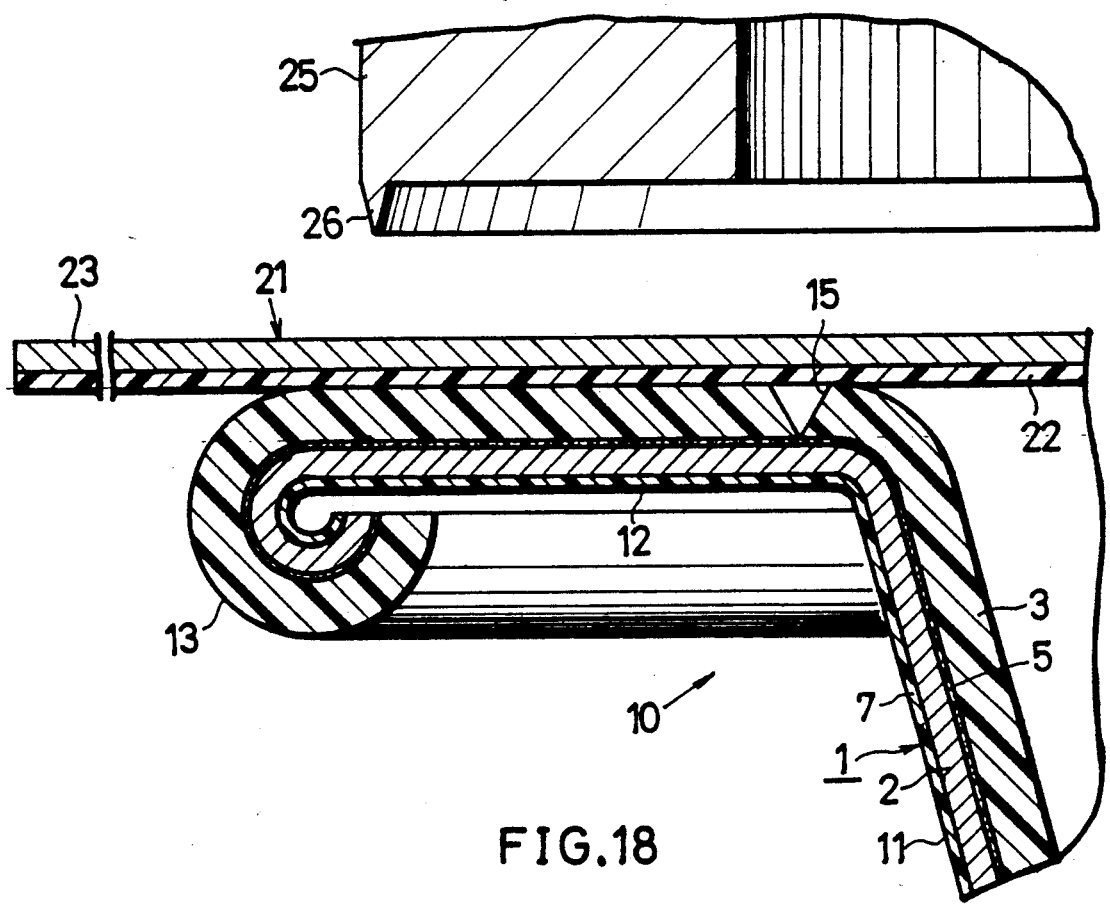
Figure 19:
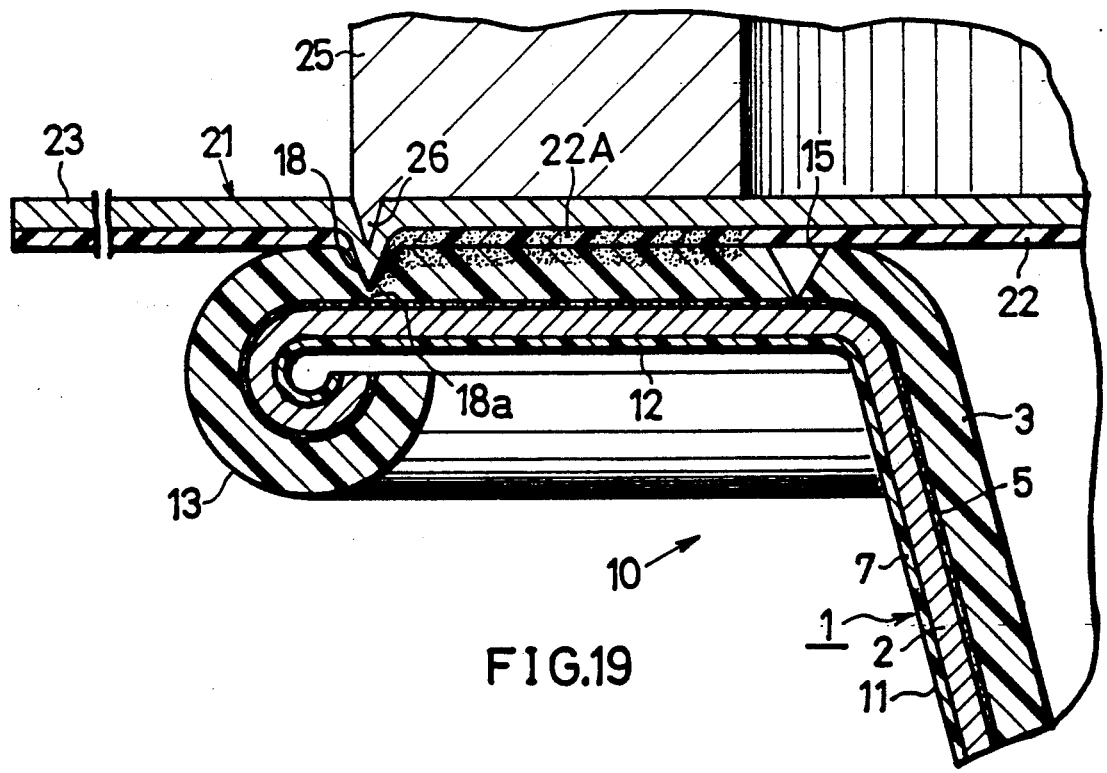

With reference to FIGS. 18 and 19, the thermoplastic resin layer 3 of the illustrated container body 11 is in the form of a single layer. The flange 12 of the container body 11 has a curled edge 13 at its outer end. The flange 12 has an inner incision 15 formed in advance at a position close to the opening periphery of the body 11 and extending approximately along the entire circumference of the flange 12. On the other hand, the heat-pressing member 25 of a heat-sealing device has an annular projection (notch blade) 26 projecting downward from the outer periphery of its lower surface (see FIG. 18).

When the lid 21 is fused to the container body 11, a cutting groove (incision) 18 is formed in the thermoplastic resin layer 3 at the same time with the annular projection 26 of the heat-pressing member (see FIG. 19). Although the illustrated groove 18 has a thin bottom wall 18a, the wall 18a may be cut by the pressure of the annular projection 26 of the heat-pressing member 25.

The method of sealing the food packaging container 10 illustrated in FIGS. 14 to 19 is adapted to fuse the heat-sealing material layer 22 of the lid 21 to the thermoplastic resin layer 3 of the container body 11 and, at the same time, to form the cutting groove 18 (incision) in the flange 12. Accordingly, the container 10 can be manufactured by a reduced number of steps at a very low equipment cost. The lid can be easily peeled off the container body after sealing without necessitating a great force for opening the container. The container is therefore very convenient to handle.

FIGS. 20 to 23 show a food packaging container 10 wherein the flange 12 is formed with an outwardly or reversely curled edge 13.

With reference to these drawings, the body 11 of the container having the flange 12 along the opening periphery thereof is prepared from a laminate sheet 1 which comprises an aluminum foil layer 2, a layer 3 of unstretched co-extruded thermoplastic resins (II) joined to one surface of the foil layer 2 with an adhesive layer 4, and a synthetic resin protective covering layer 7 joined to the other surface of the aluminum foil layer 2 with an adhesive layer 8 and not fusible to a heat-sealing material layer 22 of a lid 21. The reversely curled ege 13 of the flange 12 of the container body 11 has on the inner side thereof the first thermoplastic resin layer 3a to be fused to the heat-sealing material layer 22 of the lid 21, and the non-fusible protective covering layer 7 on the outer side. The flange 12 is formed in the first resin layer 3a with incisions 15 and 16 positioned close to the opening-defining inner periphery of the container body and at the base portion of the curled edge 13, respectively, and extending approximately along the entire circumference of the flange 12. The adhesive strength of the innermost first resin layer 3a of the container body 11 and the second resin layer 3b is smaller than the adhesive strength between the heat-sealing material layer 22 of the lid 21 and the first resin layer 3a between the incisions 15, 16 at the fused portion.

As seen in FIG. 22, the two incisions 15, 16 are formed in the first resin layer 3a of the flange 12 by an incising device 27 having two downward annular projections (notch blades) 26a, 26b at the same time. Of these two incisions 15, 16, the outer incision 16 at the base end of the curled edge 13 has a larger width than the inner incision 15. If the portion of the flange 12 outward from the outer incision 16 is reversely curled to form the edge 13 after the two incisions 15, 16 are formed, the inside first resin layer 3a will contract, greatly reducing the width of the outer incision 16 and possibly closing the incision. This situation is avoidable by initially giving an increased width to the outer incision 16.

Figure 20:
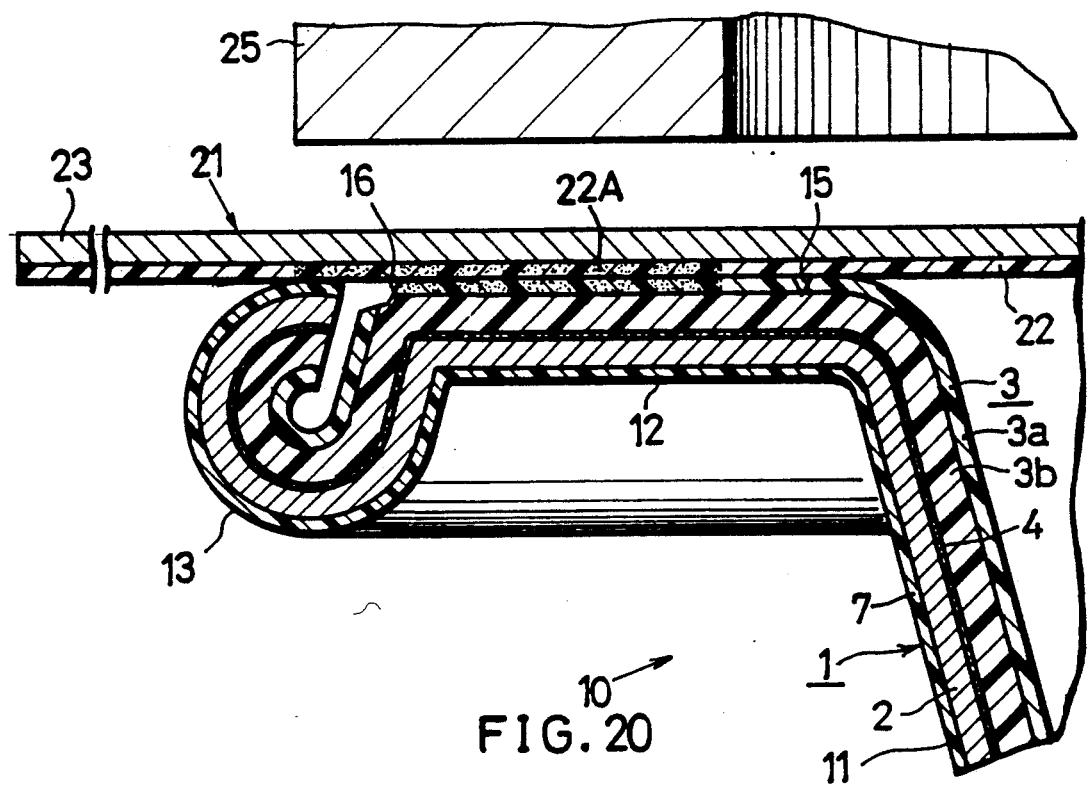
FIG. 20 is an enlarged fragmentary view in section of a food packaging container having a reversely curled edge before heat sealing.
Figure 21:
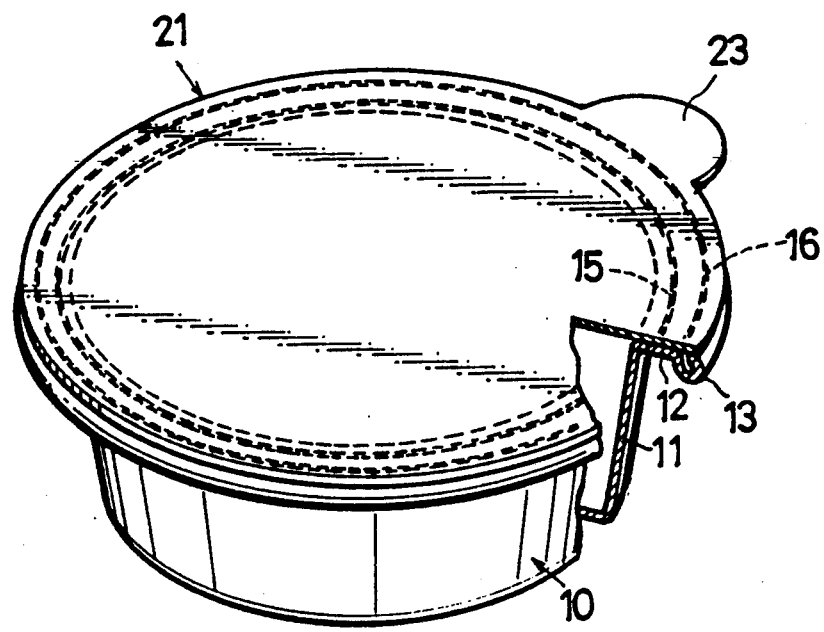
FIG. 21 is a perspective view partly broken away and schematically showing the same as heat-sealed with a lid placed thereon.

With the container 10 shown in FIG. 20, the reversely curled edge 13 of the flange 12 of the container body 11 is so formed that the first resin layer 3a to be fused to the heat-sealing material layer 22 of the lid 21 is positioned inside, with the non-fusible protective layer 7 positioned outside. Accordingly, the heat-sealing material layer 22 of the closure 21 is in contact with the layer 7 of the curled edge 13, with the result that even if the position of heating and pressing by the heat-pressing member 25 of a heat-sealing device somewhat shifts toward the curled edge 13, the sealing material layer 22 of the lid 21 will not be fused to the curled edge 13 outside the outer incision 16. The container can therefore be heat-sealed properly, while the lid can be easily peeled off to open the container 10 without necessitating a great force. Thus the container is very convenient to handle.

Figure 24:
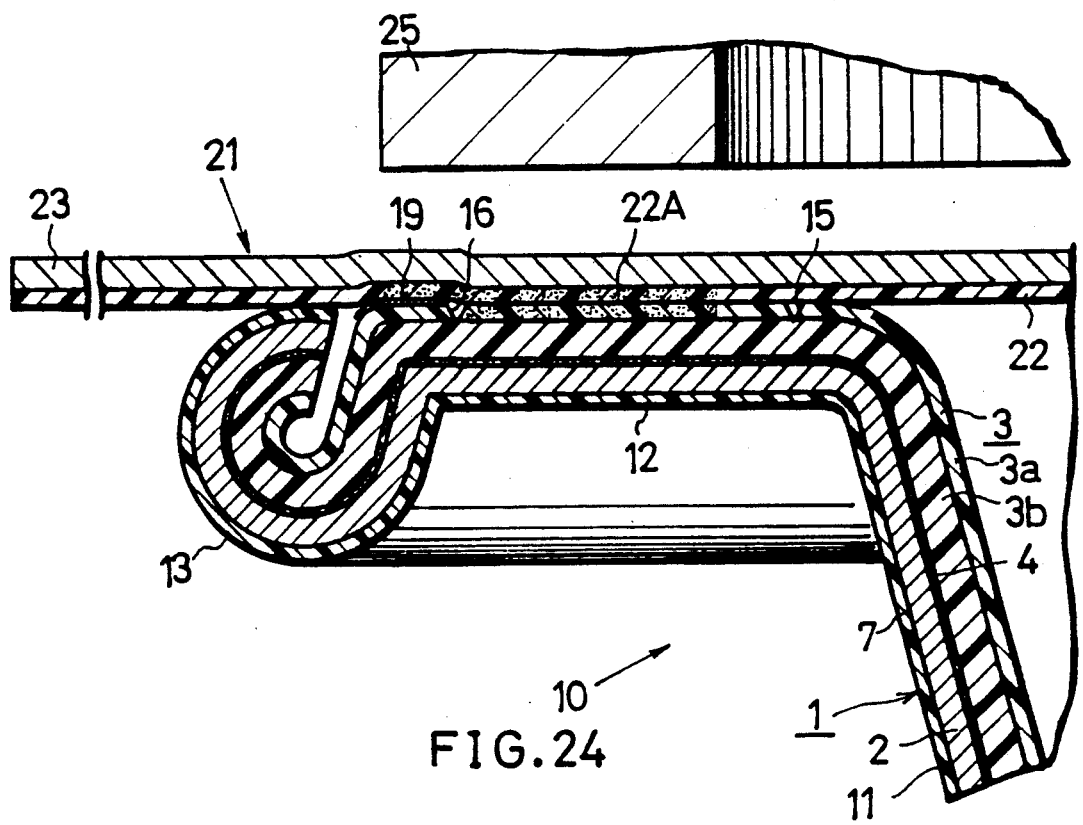
FIG. 24 is an enlarge fragmentary view in section showing another food packaging container having a reversely curled ege.
Figure 25:
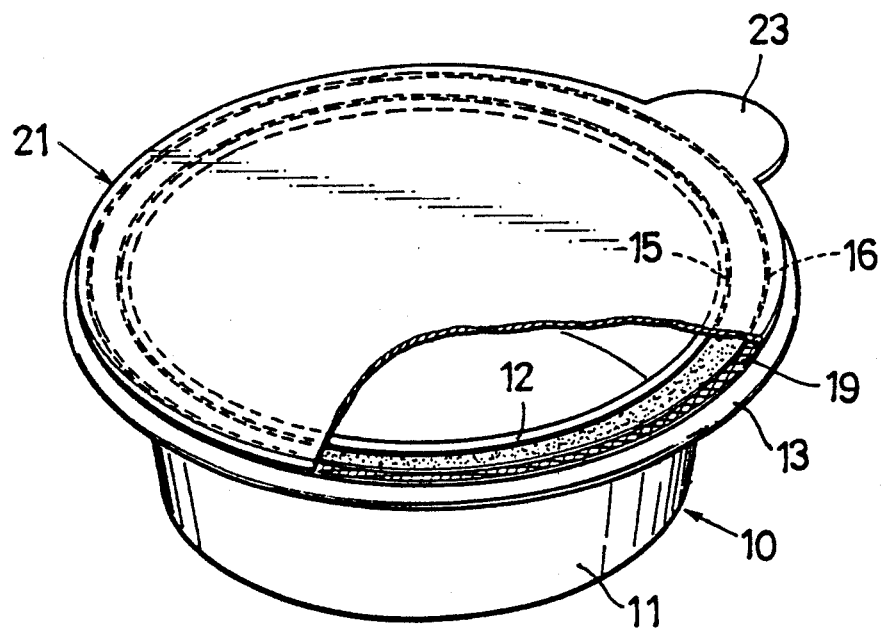
FIG. 25 is a perspective view partly broken away and schematically showing the same as heat-sealed with a lid placed thereon.

FIGS. 24 and 25 show another food packaging container 10 wherein the flange 12 similarly has a reversely curled edge 13 and is provided with an outer incision 16 close to the edge 13. Accordingly, it is likely that the heat-sealing material layer 22 will be fused to the first thermoplastic resin layer 3a outside the outer incision 16 owing to a shift in the position of heating and pressing by the heat-pressing member 25 for heat sealing. To preclude this, a fusion preventing layer 19 is provided on the surface of the first resin layer 3a of the flange 12 between the outer incision 12 and the curled edge 13.

Examples of materials useful for forming the fusion preventing layer 19 are polyamide resin, polyester resin, polyamide-nitrocellulose copolymer, silicone resin-nitrocellulose copolymer, silicone resin, urethane resin, aminoalkyd resin, wax and the like. Preferably, the layer 19 is about 1 to about 5 μm in thickness. The layer 19 is provided, for example, by coating or affixing.

With the fusion preventing layer 19 provided, the container can be heat-sealed properly, while the lid can be peeled off easily without necessitating a great force to open the container 10 in a stable manner. The food packaging container 10 is therefore very convenient to handle.

Alternatively, the fusion preventing layer 19 may be formed on the heat-sealing material layer 22 of the lid 21.

Examples of the present invention will be described with reference to FIGS. 7 to 9.

EXAMPLES

Each of the food packaging container 10 to be formed included a container body 11 having a flange 12 around an opening-defining peripheral edge and prepared from a laminate sheet 1 comprising an aluminum foil layer 2 120 μm in thickness, and a thermoplastic resin layer 3 300 μm in thickness and joined to one surface of the foil layer 2 with an adhesive layer 4, by deep-drawing the laminate sheet 1 with the resin layer 3 inside. The flange 12 was formed with a curled edge 13 at its outer end.

In Examples 1, 3 and 4, the thermoplastic resin layer 3 was made of a single thermoplastic resin. In Example 2, the resin layer 3 was made of unstretched co-extruded thermoplastic resins.

The circular blank cut out from the laminate sheet 1 and to be deep-drawn was 115 mm in diameter. The container body 11 shaped was 70 mm in opening diameter and 30 mm in depth. Accordingly, the drawing ratio of the container body 11, i.e., the depth/opening diameter (H/W) ratio, was 3/7.

Different kinds of aluminum foil layers 2 and thermoplastic resin layers 3 having different mechanical properties were used to obtain laminate sheets 1 for preparing the containers 10. The materials were deep-drawn and thereby tested for wrinkles in the flange 12, for fractures and for the ability to form a uniform curled edge 13. The results obtained are listed in the table to follow.

Similarly tested for comparison were laminate sheets prepared from aluminum foil layers and thermoplastic resin layers which were outside the ranges of the invention in thickness and mechanical properties. The results are also given in the table.

When the blank holder pressure applied to the flange 12 for deep drawing was 300 kg, the flange 12 wrinkled in the examples of the invention and also in the comparative examples, so that an increased blank holder pressure of 500 kg was used for testing.

When the deep-drawing test produced no wrinkles in the flange 12, the result is represeted by O, and if the flange 12 wrinkled, the result is represented by X. The material which was free of fracture is represeted by O, and the material fractured by X. The material which was uniformly curled at the outer end of the flange 12 is represented by O. If otherwise, the result is represented by X. The material which developed a fracture due to drawing was not tested for curling and is represented by —.

In addition to the kind and thickness (μm) of aluminum foil layers 3, the table also shows the mechanical properties thereof, i.e., tensile strength $\alpha_B$ (kgf/mm$^2$), proof stress $\alpha_{0.2}$ (kgf/mm$^2$), elongation $\delta$ (%) and earing ratio (%).

Also listed for the thermoplastic resin layers 3 are the mechanical properties thereof, i.e., the machine direction (MD) to transverse direction (TD) ratio of modulus of elasticity in tension, the MD/TD ratio of elongation, and the MD/TD ratio of breaking strength.

| Example No. | Aluminum foil | | | | | |
|---|---|---|---|---|---|---|
| | Kind | Thickness (μm) | Tensile strength | Proof stress $\sigma_{0.2}$ | Elongation (%) | Earing ratio (%) |
| Example | | | | | | |
| 1 | 3S(3003) | 120 | 11.5 | 4.0 | 27 | 4 |
| 2 | 3S(3003) | 120 | 11.5 | 4.0 | 27 | 4 |
| 3 | 4S(3004) | 120 | 18.0 | 6.4 | 18 | 5 |
| 4 | G8(8011) | 120 | 10.2 | 3.4 | 28 | 3 |
| Comp. Ex. | | | | | | |
| 1 | H(1N30) | 120 | 8.0 | 2.3 | 17 | 7 |
| 2 | 3S(3003) | 35 | 11.5 | 4.0 | 27 | 4 |
| 3 | 3S(3003) | 120 | 11.5 | 4.0 | 27 | 4 |
| 4 | 3S(3003) | 120 | 11.5 | 4.0 | 27 | 4 |

| Example No. | Synthetic resin layer | | | | |
|---|---|---|---|---|---|
| | Kind | Thickness (μm) | Ratio of modulus of elasticity in tension | Ratio of elongation | Ratio of breaking strength |
| Example | | | | | |
| 1 | Polypropylene | 300 | 0.98 | 1.13 | 1.32 |
| 2 | Polyethylene | 70 | 1.03 | 1.20 | 1.33 |
| | Polypropylene | 230 | 0.98 | 1.35 | 1.49 |
| 3 | Polypropylene | 300 | 1.00 | 0.90 | 1.11 |
| 4 | Polyethylene | 300 | 1.03 | 1.20 | 1.33 |
| Comp. Ex. | | | | | |
| 1 | Polypropylene | 300 | 0.98 | 1.13 | 1.32 |
| 2 | " | 300 | 0.98 | 1.13 | 1.32 |
| 3 | " | 300 | 1.16 | 1.02 | 1.46 |
| 4 | " | 550 | 0.98 | 1.13 | 1.32 |

| Example No. | Test result | | |
|---|---|---|---|
| | Wrinkling | Fracture | Curl |
| Example | | | |
| 1 | O | O | O |
| 2 | O | O | O |
| 3 | O | O | O |
| 4 | O | O | O |
| Comp. Ex. | | | |
| 1 | O | X | — |
| 2 | O | X | — |
| 3 | O | O | X |

-continued

| Example No. | Test result | | |
|---|---|---|---|
| | Wrinkling | Fracture | Curl |
| 4 | ○ | X | — |

The above table reveals that even when an increased blank holder pressure of 500 kg was applied to the flange 12 to prevent the flange 12 from wrinkling during the shaping of the container 10, the drawing process produced no fracture in the material of the invention or no ears in the flange 12, permitting the outer end of the flange 12 to be easily formed into a curled edge 13 of uniform size over the entire circumference thereof.

In the case of comparative examples, on the other hand, the application of increased blank holder pressure of 500 kg to the flange fractured the material or produced ears, making it difficult to curl the flange outer end and making it impossible to form a curled edge of uniform size over the entire circumference.

What is claimed is:

1. A food packaging container having a flanged container body of a laminate sheet comprising a layer of aluminum foil and at least one thermoplastic resin layer joined to one surface of the foil layer, the container body being prepared by deep-drawing the laminate sheet with the resin layer inside, the container being characterized in that the aluminum foil layer of the laminate sheet comprises an aluminum foil 40–200 μm in thickness, 9.0–25.0 kgf/mm² in tensile strength, 2.5–9.5 kgf/mm² in proof stress, 10 to 40% in elongation and up to 7% in earing ratio, the thermoplastic resin layer of the sheet comprising a thermoplastic resin 100–500 μm in thickness, 0.92–1.08 in the ratio of modulus of elasticity in tension in the machine direction (MD) to that in the transverse direction (TD), 0.60–1.40 in the MD/TD ratio of elongation and 0.40–1.60 in the MD/TD ratio of breaking strength.

2. A container as defined in claim 1 wherein the laminate sheet is deep-drawn at a drawing ratio (depth of the container body H/opening diameter of the container body W) of at least 40%.

3. A container as defined in claim 1 wherein the resin layer positioned on the surface side of the container body and to be joined to a heat-sealing material layer of a lid is separably joined to the layer on the rear side of the resin layer, and the flange is formed in the surface-side resin layer with an annular incision positioned in the vicinity of the opening-defining inner periphery of the container body and extending along the entire circumference of the flange.

4. A container as defined in claim 3 wherein the thermoplastic resin layer of the laminate sheet comprises at least two resin layers, and the resin layer on the surface side to be joined to the heat-sealing material layer of the lid is separably joined to the resin layer on the rear side thereof with a bond strength of 500–1500 g/15 mm width.

5. A container as defined in claim 3 wherein the thermoplastic resin layer of the laminate sheet is in the form of a single resin layer, and the resin layer is separably joined to the aluminum foil layer on the rear side thereof by a joint layer with a bond strength of 500 to 1500 g/15 mm width.

6. A container as defined in claim 4 wherein the thermoplastic resin layer of the laminate sheet comprises unstretched co-extruded thermoplastic resins in the form of at least two resin layers.

7. A container as defined in claim 6 wherein the surface-side resin layer of the unstretched co-extruded thermoplastic resin layer is made of high-density polyethylene, and the resin layer separably joined to the rear side thereof is made of one of polypropylene and a mixture of polypropylene and polyethylene.

8. A container as defined in claim 4 wherein the resin layer on the surface side of the thermoplastic resin layer of the laminate sheet is separably joined to the resin layer on the rear side thereof with an adhesive layer.

9. A container as defined in claim 4 wherein the aluminum foil layer is joined to the thermoplastic resin layer with at least one adhesive selected from the group consisting of urethane adhesive, polyester adhesive, and monoolefin-unsaturated carboxylic acid copolymer resins or metal salts thereof.

10. A container as defined in claim 3 wherein the annular incision is formed in the surface-side resin layer of the flange simultaneously when the heat-sealing material layer of the lid is fused to the surface-side resin layer by a heat-pressing member of a heat-sealing device having an annular projection projecting downward from the inner periphery of the lower surface of the member.

11. A container as defined in claim 3 wherein the flange of the container body has a bent edge at its outer end and is formed in the surface-side resin layer with an annular outer incision positioned approximately at the bent edge portion and extending along the entire circumference of the flange, and the heat-sealing material layer of the lid is fused to the surface-side resin layer over the portion thereof between the outer incision and the inner incision positioned toward the opening-defining inner periphery of the container body.

12. A container as defined in claim 11 wherein the annular outer incision is formed in the surface-side resin layer of the flange simultaneously when the heat-sealing material layer of the lid is fused to the surface-side resin layer by a heat-pressing member of a heat-sealing device having an annular projection projecting downward from the outer periphery of the lower surface of the member.

13. A container as defined in claim 11 wherein the annular outer incision is provided in the vicinity of the bent edge of the flange, and a fusion preventing layer is provided on the surface of one of the resin layer of the flange and the heat-sealing material layer of the lid and positioned between the outer incision and the bent ege.

14. A container as defined in claim 1 wherein a synthetic resin protective covering layer is provided over the outer surface of the aluminum foil layer.

15. A container as defined in claim 14 wherein a synthetic resin ground layer containing a zirconium compound is formed on one surface of the aluminum foil layer, and the protective covering layer is joined to the ground layer.

16. A container as defined in claim 14 wherein a synthetic resin ground layer containing a chromium compound is formed on one surface of the aluminum foil layer, and the protective covering layer is joined to the ground layer.

17. A container as defined in claim 14 wherein the protective covering layer provided over the outer surface of the aluminum foil layer is made of a synthetic resin non-fusible to a heat-sealing material layer of a lid, and the flange of the container body is formed at its outer end with a curled edge having the thermoplastic resin layer positioned inside and the non-fusible protective covering layer positioned outside, the flange being formed in the resin layer on the surface side thereof with inner and outer two annular incisions positioned approximately at the opening-defining inner peripheral portion of the container body and at the base end of the curled edge respectively and extending generally along the entire circumference of the flange.

18. A container as defined in claim 1, wherein said laminate sheet comprises said aluminum foil layer and at least two thermoplastic resin layers, and the resin layer on the surface side to be joined to a heat-sealing material layer of a lid is separably joined to said resin layer of the rear side thereof with a bond strength of 500–1500 g/15 mm width, and the flange is formed in the surface-side resin layer with an annular incision positioned in the vicinity of the opening-defining inner periphery of the container body and extending along the entire circumference of the flange, and the aluminum foil layer is joined to the at least two thermoplastic resin layers with at least one adhesive selected from the group consisting of urethane adhesive, polyester adhesive, and monoolefin-unsaturated carboxylic acid copolymer resins or meal salts thereof.

19. A container as defined in claim 18, wherein the at least two thermoplastic resin layers joined to the aluminum foil layer of the laminate sheet comprises unstretched co-extruded thermoplastic resin in the form of at least two resin layers.

20. A container as defined in claim 19, wherein the surface-side resin layer of the unstretched co-extruded thermoplastic resin layer is made of a high-density polyethylene, and the resin layer separably joined to the rear side thereof is made of one of polypropylene and a mixture of polypropylene and polyethylene.

21. A container as defined in claim 1, wherein the flange of the container body has a bent edge at its outer end and is formed in the surface-side resin layer with an annular outer incision positioned approximately at the bent edge portion and extending along the entire circumference of the flange, and a heat-sealing material layer of a lid is fused to the surface-side resin layer over the portion thereof between the outer incision and the inner incision positioned toward the opening-defining inner periphery of the container body.

22. A container as defined in claim 1, wherein a synthetic resin protective covering layer is provided over the outer surface of the aluminum foil layer.

23. A container as defined in claim 22, wherein a synthetic resin ground layer containing a zirconium compound is formed on one surface of the aluminum layer, and the protective covering layer is joined to the ground layer.

24. A container as defined in claim 22, wherein a synthetic resin ground layer containing a chromium compound is formed on one surface of the aluminum foil layer, and the protective covering layer is joined to the ground layer.

25. A container as defined in claim 22, wherein the protective covering layer provided over the outer surface of the aluminum foil layer is made of a synthetic resin non-fusible to a heat-sealing material layer of a lid, and the flange of the container body is formed at it outer end with a curled edge having the thermoplastic resin layer positioned inside and the non-fusible protective covering layer positioned outside, the flange being formed in the resin layer on the surface side thereof with inner and outer annular incisions positioned approximately at the opening-defining inner peripheral portion of the container body and at the base end of the curled edge, respectively, and extending generally along the entire circumference of the flange.

* * * * *